United States Patent
Goldberg et al.

(10) Patent No.: US 12,499,542 B2
(45) Date of Patent: Dec. 16, 2025

(54) SYSTEMS AND METHODS FOR VISION TEST AND USES THEREOF

(71) Applicant: Warby Parker Inc., New York, NY (US)

(72) Inventors: Dee Celeste Goldberg, New York, NY (US); Taylor Alexandra Duffy, Waldwick, NJ (US); David J. DeShazer, Verona, NJ (US)

(73) Assignee: Warby Parker Inc., New York, NY (US)

( * ) Notice: Subject to any disclaimer, the term of this patent is extended or adjusted under 35 U.S.C. 154(b) by 694 days.

(21) Appl. No.: 17/858,303

(22) Filed: Jul. 6, 2022

(65) Prior Publication Data

US 2023/0020578 A1    Jan. 19, 2023

Related U.S. Application Data

(60) Provisional application No. 63/219,327, filed on Jul. 7, 2021.

(51) Int. Cl.
*G06T 7/00*    (2017.01)
*A61B 3/00*    (2006.01)
(Continued)

(52) U.S. Cl.
CPC .......... *G06T 7/0014* (2013.01); *A61B 3/0033* (2013.01); *A61B 3/005* (2013.01);
(Continued)

(58) Field of Classification Search
CPC ......... G06T 7/0014; G06T 7/136; G06T 7/11; G06T 7/571; G06T 7/13; G06T 7/90;
(Continued)

(56) References Cited

U.S. PATENT DOCUMENTS 5,157,427 A * 10/1992 Humphrey ........... A61B 3/1208
351/205
5,255,027 A * 10/1993 Reiner .................... A61B 3/08
351/239

(Continued)

FOREIGN PATENT DOCUMENTS

CN    115105007 B * 5/2025    ......... G06F 3/04845
EP    3669751 A1    6/2020
(Continued)

OTHER PUBLICATIONS

Roheet; Bhatnagar et al. "Distance Estimation in Video using Machine Learning", Mar. 2023, IEEE (Year: 2023).*

(Continued)

*Primary Examiner* — Aaron W Carter
*Assistant Examiner* — Alejandro Hernandez
(74) *Attorney, Agent, or Firm* — Duane Morris LLP

(57) ABSTRACT

Systems and methods for vision test and uses thereof are disclosed. A method may be implemented on a mobile device having at least a processor, a camera and a display screen. The method may include capturing at least one image of a user using the camera of the mobile device; interactively guiding the user to a predetermined distance from the display screen of the mobile device based on the at least one image; presenting material on the display screen upon a determination that the user is at the predetermined distance from the display screen; and receiving input from the user in response to the material presented on the display screen. The material presented on the display screen may be for assessing at least one characteristic of the user's vision. Mobile devices and non-transitory machine-readable mediums having machine-executable instructions embodied thereon for assessing a user's vision also are disclosed.

19 Claims, 15 Drawing Sheets
(6 of 15 Drawing Sheet(s) Filed in Color)

(51) Int. Cl.

| | |
|---|---|
| *A61B 3/032* | (2006.01) |
| *A61B 3/06* | (2006.01) |
| *G06T 7/11* | (2017.01) |
| *G06T 7/13* | (2017.01) |
| *G06T 7/136* | (2017.01) |
| *G06T 7/571* | (2017.01) |
| *G06T 7/60* | (2017.01) |
| *G06T 7/70* | (2017.01) |
| *G06T 7/90* | (2017.01) |
| *H04N 5/77* | (2006.01) |
| *H04N 23/60* | (2023.01) |
| *H04N 23/63* | (2023.01) |

(52) U.S. Cl.
CPC .............. *A61B 3/032* (2013.01); *A61B 3/066* (2013.01); *G06T 7/11* (2017.01); *G06T 7/13* (2017.01); *G06T 7/136* (2017.01); *G06T 7/571* (2017.01); *G06T 7/60* (2013.01); *G06T 7/70* (2017.01); *G06T 7/90* (2017.01); *H04N 5/77* (2013.01); *H04N 23/631* (2023.01); *H04N 23/64* (2023.01); *G06T 2207/10016* (2013.01); *G06T 2207/10024* (2013.01); *G06T 2207/30041* (2013.01)

(58) Field of Classification Search
CPC ... G06T 7/70; G06T 7/60; G06T 2207/10016; G06T 2207/10024; G06T 2207/30041; G06T 19/006; G06T 7/0012; H04N 23/64; H04N 23/631; H04N 5/77; A61B 3/0033; A61B 3/005; A61B 3/032; A61B 3/066; A61B 3/02; A61B 3/12; A61B 3/024; A61B 3/0016; A61B 3/14; A61B 3/00; A61B 3/0041; A61B 3/028; G06V 40/16; G06V 40/165; G06V 40/161; G06V 40/10; G06F 3/01; G06F 3/013; G01B 11/14; G02B 27/0075
See application file for complete search history.

(56) References Cited

U.S. PATENT DOCUMENTS

| | | | | |
|---|---|---|---|---|
| 9,253,477 | B2* | 2/2016 | Shim | H04N 13/194 |
| 10,687,700 | B2* | 6/2020 | Kawahara | A61B 3/032 |
| 10,849,492 | B2* | 12/2020 | Tomasi | A61B 3/152 |
| 11,488,239 | B2* | 11/2022 | Goldberg | G02C 13/005 |
| 12,114,926 | B2* | 10/2024 | Carrafa | A61B 3/0058 |
| 12,137,974 | B1* | 11/2024 | Freeman | A61B 3/024 |
| 2003/0103192 | A1 | 6/2003 | Leinonen | |
| 2008/0100802 | A1* | 5/2008 | Hanebuchi | A61B 3/1225 |
| | | | | 351/211 |
| 2011/0007949 | A1* | 1/2011 | Hanna | G06V 40/161 |
| | | | | 382/116 |
| 2011/0090459 | A1* | 4/2011 | Rathjen | A61B 3/107 |
| | | | | 351/212 |
| 2014/0043234 | A1 | 2/2014 | Eilat et al. | |
| 2014/0226128 | A1 | 8/2014 | Lawson et al. | |
| 2014/0354949 | A1* | 12/2014 | Bakar | A61B 3/14 |
| | | | | 351/246 |
| 2015/0055086 | A1* | 2/2015 | Fonte | H04L 65/403 |
| | | | | 700/98 |
| 2016/0270648 | A1* | 9/2016 | Freeman | A61B 3/12 |
| 2017/0231487 | A1* | 8/2017 | Carrafa | A61B 3/032 |
| | | | | 351/223 |
| 2019/0175011 | A1* | 6/2019 | Jensen | A61B 3/0025 |
| 2021/0011255 | A1* | 1/2021 | Emori | H04N 23/67 |
| 2021/0022603 | A1* | 1/2021 | Predham | G16H 40/60 |
| 2021/0093183 | A1 | 4/2021 | Carrafa et al. | |
| 2021/0264639 | A1* | 8/2021 | Miginnis | G03B 43/00 |
| 2021/0393121 | A1 | 12/2021 | Goldberg et al. | |
| 2022/0151483 | A1* | 5/2022 | Ono | A61B 3/14 |
| 2022/0286619 | A1* | 9/2022 | Lavoie | G05D 1/0038 |
| 2022/0313077 | A1* | 10/2022 | Singh | A61B 3/14 |
| 2024/0013431 | A1* | 1/2024 | Goldberg | H04N 23/695 |
| 2024/0252036 | A1* | 8/2024 | Lussier | G02B 27/0075 |
| 2024/0268658 | A1* | 8/2024 | Segaram | G06T 7/11 |

FOREIGN PATENT DOCUMENTS

| | | | |
|---|---|---|---|
| TW | 1659725 B | * | 5/2019 |
| WO | 2021186990 A1 | | 9/2021 |
| WO | 2022013410 A2 | | 1/2022 |

OTHER PUBLICATIONS

Zhang, Z., "A Flexible New Technique for Camera Calibration", IEEE Translations on Pattern Analysis and Machine Intelligence, (2000) 22(11):1330-1334.
"VNDetectFaceLandmarksRequest: An image analysis request that finds facial features like eyes and mouth in an image," available at: https://developer.apple.com/documentation/vision/vndetectfacelandmarksrequest; archived on May 21, 2022 by the Internet Archive (www.archive.org).
"VNDetectHumanBodyPoseRequest: A request that detects a human body pose," available at: https://developer.apple.com/documentation/vision/vndetecthumanbodyposerequest; archived on May 11, 2021 by the Internet Archive (www.archive.org).
MediaPipe Pose, a Google Github article available at: https://google.github.io/mediapipe/solutions/pose.html, updated on Mar. 31, 2022.
"Pose estimation", a Tensorflow.org available at: https://www.tensorflow.org/lite/examples/pose_estimation/overview, (2020).
Dec. 29, 2022 PCT Notification of Transmittal of the International Search Report and the Written Opinion of the International Searching Authority, or the Declaration for International PCT Application No. PCT/US22/36180.
Dias, Pedro, "Smartphone serious games for senses evaluation," In: University of Porto, Jul. 28, 2014, 50 pages.
Extended European Search Report for European Patent Application No. 22838325.3 dated Apr. 30, 2025, 9 pages.

* cited by examiner

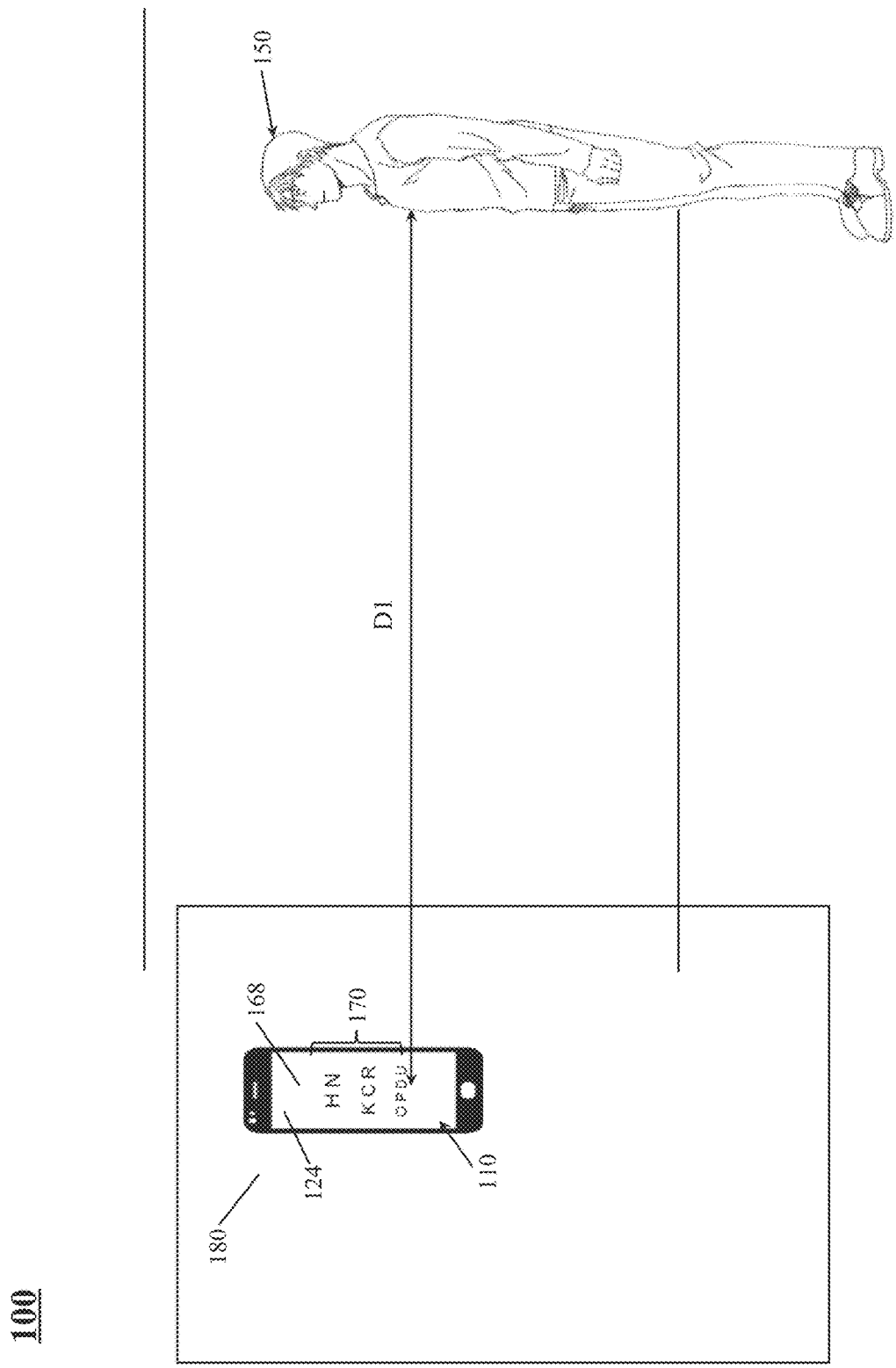

SYSTEMS AND METHODS FOR VISION TEST AND USES THEREOF

CROSS-REFERENCE TO RELATED APPLICATION

This application claims priority to U.S. Provisional Patent Application Ser. No. 63/219,327, filed Jul. 7, 2021, the entirety of which is incorporated by reference herein.

FIELD

The present disclosure generally relates to the technical field of vision test. More specifically, the present disclosure is directed to systems and methods for performing a vision test for a user using a mobile device, and uses thereof.

BACKGROUND

The following includes information that may be useful in understanding the invention. It is not an admission that any of the information specifically or implicitly referenced herein is prior art, or essential, to the described or claimed invention. All patents, patent applications, publications and products mentioned herein and their contents are hereby incorporated by reference in their entirety.

Eye examinations or vision tests are routinely used to determine the appropriate lens prescription or make other diagnoses for patients. Eye exams have traditionally been performed by optometrists or the like in an office where the test subject is positioned at a set distance from an eye chart displaying optotypes of a known size. The test administrator is able to calculate the perceived size of the optotypes from the perspective of the test subject, and draw conclusions regarding the subject's vision according to the test results. Efforts to translate eye exam procedures from a doctor or technician's office to non-traditional locations such as self-administered tests at home are hampered by the difficulties associated with ascertaining the perceived size of the characters used in the test. Previously disclosed solutions such as using a measuring tape or counting steps to determine a distance from a computer screen displaying an eye test require additional equipment or steps, diminish the accuracy of the results, and may erode a user's confidence in the results, making a test administered out of office less attractive.

Thus, there is a need to develop an improved system or method for conducting an eye examination or vision test that will increase accuracy, efficiency, reliability, convenience and use, while decreasing or eliminating human intervention and/or human error.

SUMMARY

The devices, systems, methods, and machine readable storage media described and claimed herein has many attributes and aspects including, but not limited to, those set forth or described or referenced in this Summary. It is not intended to be all-inclusive and the invention described and claimed herein are not limited to or by the features or embodiments identified in this Summary, which is included for purposes of illustration only and not restriction.

In various embodiments of the present disclosure, systems and methods are provided for assessing a user's vision. Such systems and methods can be used to determine a fit quality (such as eyewear prescription) between a user and a head wearable device, such as eyeglasses (or spectacles), sunglasses, virtual reality headsets, googles, safety eyewear, smartglasses (including, but not limited to, augmented reality eyeglasses) and other eyewear. Such systems and methods also provide for an at-home vision test.

In one example, a method, implemented on a mobile device having at least a processor, a camera and a display screen, for assessing a user's vision, is disclosed. The method may include guiding the user to hold the mobile device, such that both the user and the display screen of the mobile device are facing a mirror in front of the user; capturing, using the camera of the mobile device, at least one image of a reflection of the mobile device in the mirror; interactively guiding the user to a predetermined distance from the mirror based on at least one image; presenting material on the display screen upon a determination that the user is at the predetermined distance from the mirror, wherein the material presented on the display screen is for assessing at least one characteristic of the user's vision; and receiving input from the user in response to the material presented on the display screen and reflected in the mirror.

In some aspects, the mobile device may be held approximately in at least one of an approximately vertical, horizontal, and diagonal orientation. The camera and display screen may be located on a same side of the mobile device.

In some aspects, the method may include presenting a reference pattern on the display screen when capturing the at least one image and the user is at least a current distance from the mirror and determining the current distance between the user and the mirror based on a focal length of the camera, the at least one image, and a predetermined physical size of the reference pattern. The user may be interactively guided to the predetermined distance from the mirror based on the current distance.

In some aspects, determining the current distance may include preprocessing the reference pattern to generate a binary image including at least one candidate shape of the reference pattern, performing a localization on the reference pattern in the at least one image, and performing a segmentation of the reference pattern from the at least one image.

In some aspects, the reference pattern may include a static, solid-colored pattern with a fixed reference pattern, and the at least one image may include an image reflection of the reference pattern in the mirror. Preprocessing the reference pattern may include computing a pixel-wise difference between the image and the fixed reference color to generate a difference image and inverse thresholding the difference image with a predetermined value to generate the binary image including at least one candidate shape of the reference pattern.

In some aspects, the reference pattern may have an aqua color with RGB components of (0, 255, 255) and may be surrounded by a black border.

In some aspects, the reference pattern may include a dynamic solid-colored pattern with a reference color that is time-varying in a predetermined manner. The reference pattern may cycle through a plurality of image frames each with a different color at a predetermined frame rate. The at least one image may include a full cycle of the image frames of the reference pattern, and each of the image frames ay be an image of a reflection of the reference pattern in the mirror during a respective time frame. Preprocessing the reference pattern at a current image frame may include determining a past image frame having a color complementary to a color of the current image frame, comparing a hue channel of the current image frame to a hue channel of the past image frame to calculate a hue difference, multiplying the hue difference with an intensity channel of the current image frame to generate a difference image, and thresholding the difference image with a predetermined value to generate the binary image including at least one candidate shape of the reference pattern.

In some aspects, performing the localization of the reference pattern may include isolating the at least one candidate shape of the reference pattern from the at least one image, filtering the at least one candidate shape based on at least one criterion related to a shape of the reference pattern presented on the display screen, and determining, in each of the at least one image, a region of interest ("ROI") comprising the shape of the reference pattern and a border surrounding the shape, based on the filtering.

In some aspects, the at least one criterion may include the shape of the reference pattern with respect to an enclosing rectangle has an area within a predetermined area range, the enclosing rectangle has an aspect ratio between ⅓ and 3, and a fill factor of the shape with respect to the enclosing rectangle is at least 95%.

In some aspects, performing the segmentation of the reference pattern may include computing horizontal and vertical gradients of an intensity channel of the at least one image; dividing the ROI into four overlapping sub-regions: a left sub-region, a right sub-region, a top sub-region and a bottom sub-region; for each row in the left and right sub-regions, determining a column for which the horizontal gradient has the largest magnitude, to generate left and right border points based on a magnitude threshold; for each column in the top and bottom sub-regions, determining a row for which the vertical gradient has the largest magnitude, to generate top and bottom border points based on the magnitude threshold; fitting the border points with lines to determine edges of the reference pattern; and determining corners of the reference pattern based on intersections of the fitted lines.

In some aspects, determining the current distance may include measuring a size of the reference pattern in pixels based on the determined edges and corners of the reference pattern calculating the current distance between the user and the mirror based on: the focal length of the camera in pixels, the measured size of the reference pattern in pixels, and the predetermined physical size of the reference pattern.

In some aspects, the predetermined physical size of the reference pattern may be predetermined based on a physical size of the display screen of the mobile device.

In some aspects, the at least one image may include a plurality of images captured during one time frame when the user is at the current distance from the mirror. Determining the current distance may include preprocessing the reference pattern in each of the plurality of images, performing a localization of the reference pattern in each of the plurality of images, performing a segmentation of the reference pattern from each of the plurality of images to generate a plurality of segmented reference patterns, measuring a size of each segmented reference pattern in pixels, determining, with respect to each segmented reference pattern, an estimate current distance between the user and the mirror based on the focal length of the camera in pixels, the measured size of the segmented reference pattern in pixels, and the predetermined physical size of the reference pattern, to generate a plurality of estimated current distances, and calculating the current distance between the user and the mirror based on an aggregation of the plurality of estimated current distances. The aggregation may include computing an average, a weighted average, or a median based on the plurality of estimated current distances.

In some aspects, interactively guiding the user may include presenting, one the display screen, a first indication of the current distance between the user ad the mirror, providing a second indication to the user when the predetermined distance has been reached, providing an instruction to the user to move in a direction relative to the mirror, providing an instruction to the user when at least part of the reference pattern is blocked by the user, and automatically resizing the reference pattern presented on the display screen when at least part of the reference pattern is blocked by the user.

In some aspects, the method may include recording, using the camera, a video of the input from the user when the input includes a hand gesture of the user; recording, using a microphone of the mobile device, an audio of the input from the user when the input comprises a voice of the user; and assess at least one characteristic of the user's vision based on the recorded video and audio.

In some aspects, the predetermined distance may be a distance in a predetermined range of distances.

In some aspects, the predetermined distance may be a different from a nominal distance in the predetermined range of distances.

In some aspects, the method may include determining a first acuity score for the user based on input received from the user and determining an acuity correction calculation for the based, at least in part, on a ration of the nominal distance and the predetermined distance.

In another example, a mobile device is disclosed. The mobile device may include a camera; a display screen; a memory comprising instructions; and a processor coupled to the camera. The processor may be configured to execute the instructions to guide a user to hold the mobile device, such that both the user and the display screen of the mobile device are facing a mirror in front of the user; capture, using the camera, at least one image of a reflection of the mobile device in the mirror; interactively guide the user to a predetermined distance from the mirror based on the at least one image; present material on the display screen upon a determination that the user is at the predetermined distance from the mirror; and receiving input from the user in response to the material presented on the display screen and reflected in the mirror. The material presented on the display screen may be for assessing at least one characteristic of the user's vision.

In some aspects, the mobile device may be held approximately in at least one of an approximately vertical, horizontal, and diagonal orientation by the user and may be approximately parallel to the mirror. The camera and the display screen may be located on a same side of the mobile device.

In some aspects, the processor may be configured to execute instructions to present a reference pattern on the display screen when capturing the at least one image and when the user is at a current distance from the mirror and determine the current distance between the user and the mirror based on: a focal length of the camera, the at least one image, and a predetermined physical size of the reference pattern. The user may be interactively guided to the predetermined distance from the mirror based on the current distance.

In some aspects, the reference pattern may include a static, solid-colored pattern with a fixed reference color and the at least one image may include an image of a reflection of the reference pattern in the mirror. The current distance may be determined based on a pixel-wise difference between the image and the fixed reference color to generate a difference image and an inverse thresholding of the difference image with a predetermined value to generate the binary image including at least one candidate shape of the reference pattern.

In some aspects, the reference pattern may include a dynamic solid-colored pattern with a reference color that is time-varying in a predetermined manner, the reference pattern cycles through a plurality of image frames each with a different color at a predetermined frame rate, the at least one image may include a full cycle of the image frames of the reference pattern and each of the image frames may be an image of a reflection of the reference pattern in the mirror during a respective time frame. The current distance may be determined at a current image frame based on a past image frame having a color complementary to a color of the current image frame, a hue difference based on a comparison of a hue channel of the current image frame and a hue channel of the past image frame, a difference image calculated as a product of the hue difference and an intensity channel of the current image frame, and a binary image, including at least one candidate shape of the reference pattern, generated based on a thresholding of the difference image with a predetermined value.

In some aspects, the predetermined distance may be a distance in a predetermined range of distances.

In some embodiments, the predetermined distance may be different from a nominal distance in the predetermined range of distances.

In some aspects, the processor may be configured to execute instructions to determine a first acuity score for the user based on input received from the user and determinate an acuity correction calculation for the user based, at least in part, on a ratio of the nominal distance and the predetermined distance.

In yet another example, a method, implemented on a mobile device having at least a processor, a camera and a display screen, for assessing a user's vision, is disclosed. The method comprises: capturing at least one image of the user using the camera of the mobile device; interactively guiding the user to a predetermined distance from the display screen of the mobile device based on the at least one image; presenting material on the display screen upon a determination that the user is at the predetermined distance from the display screen, wherein the material presented on the display screen is for assessing at least one characteristic of the user's vision; and receiving input from the user in response to the material presented on the display screen.

In yet another example, a mobile device is disclosed. The mobile device may include a camera; a display screen; a memory comprising instructions; and a processor coupled to the camera. The processor may be configured to execute the instructions to: capture at least one image of a user using the camera; interactively guide the user to a predetermined distance from the display screen based on the at least one image; present material on the display screen upon a determination that the user is at the predetermined distance from the display screen, and receive input from the user in response to the material presented on the display screen. The material presented on the display screen may be for assessing at least one characteristic of the user's vision.

In some examples, a mobile device may include a camera, a display screen, a memory comprising instructions, and a processor communicatively coupled to the camera. The processor may be configured to execute the instructions to capture at least one image of a user using the camera, interactively guide the user to a predetermined distance from the display screen based on the at least one image, present material for assessing at least one characteristic of the user's vision on the display screen upon a determination that the user is at the predetermined distance from the display screen, and receive input from the user in response to the material presented on the display screen.

In some aspects, the mobile device may be held against an approximately vertical surface, the camera and the display screen may be located on a same side of the mobile device, and the predetermined distance may be about 10 feet.

In some aspects, the processor may be configured to execute the instructions to estimate at least one physical length feature of the user and determine a current distance from the user to the display screen of the mobile device, based on: a focal length of the camera, the at least one image, and the at least one physical length feature. The user may be interactively guided to the predetermined distance from the display screen based on the current distance.

In some aspects, the at least one physical length features may include a pupillary distance ("PD") of the user.

In some aspects, the at least one image may include an image captured when the user is at the current distance from the display screen. The current distance may be determined by the processor executing instructions to determine a pixel PD in pixels between pupils of the user in the image and to calculate the current distance from the user to the display screen based on the focal length of the camera in pixels, the pixel PD in pixels, and the physical PD.

In some aspects, the at least one image may include a first image captured when the user is at an initial distance from the display screen and a second image captured when the user is at the current distance from the display screen. The current distance may be larger than the initial distance and closer to the predetermined distance than the initial distance. The processor may determine the current distance by executing instructions to determine, in the first image, a first length in pixels of a first feature of the user and a second length in pixels of a second feature of the user; calculate a first ratio between the second length and the first length; determine, in the second image, a third length in pixels of the second feature of the user; and calculate the current distance from the user to the display screen based on: the focal length of the camera in pixels, the first ratio, the third length in pixels, and a physical length of the first feature.

In some aspects, the predetermined distance may be a distance in a predetermined range of distances and may be different from a nominal distance. The processor may be configured to execute instructions to determine a first acuity score for the user based on input received from the user and determine an acuity correction calculation for the user based, at least in part, on a ratio of the nominal distance and the predetermined distance.

Other concepts relate to software for implementing the present disclosure on assessing a user's vision. A software product, in accord with this concept, may include at least one machine-readable non-transitory medium and information carried by the medium. The information carried by the medium may be executable program code data, parameters in association with the executable program code, and/or information related to a user, a request, content, or information related to a social group, etc.

In one example, a non-transitory machine-readable medium having machine-executable instructions embodied thereon for assessing a user's vision is disclosed. The machine-executable instructions, when executed by a processor of a mobile device, may cause the processor to perform a method. The method may include capturing at least one image of the user using the camera of the mobile device; interactively guiding the user to a predetermined distance from the display screen of the mobile device based on the at least one image; presenting material on the display screen upon a determination that the user is at the predetermined distance from the display screen; and receiving input from the user in response to the material presented on the display screen. The material presented on the display screen may be for assessing at least one characteristic of the user's vision.

In another example, a non-transitory machine-readable medium having machine-executable instructions embodied thereon for assessing a user's vision is disclosed. The machine-executable instructions, when executed by a processor of a mobile device, may cause the processor to perform a method. The method may include guiding the user to hold the mobile device, such that both the user and the display screen of the mobile device are facing a mirror in front of the user; capturing, using the camera of the mobile device, at least one image of a reflection of the mobile device in the mirror; interactively guiding the user to a predetermined distance from the mirror based on the at least one image; presenting material on the display screen upon a determination that the user is at the predetermined distance from the mirror; and receiving input from the user in response to the material presented on the display screen and reflected in the mirror. The material presented on the display screen may be for assessing at least one characteristic of the user's vision.

In some embodiments, the predetermined distance is a distance in a predetermined range of distances and different from a nominal distance. The method may include determining a first acuity score for the user based on input received from the user and determining an acuity correction calculation for the user based, at least in part, on a ratio of the nominal distance and the predetermined distance.

In another example, a method may include capturing, using a camera of a mobile device, at least one image of a user; interactively guiding the user to a predetermined distance from a display screen of the mobile device based on the at least one image; presenting material on the display screen upon a determination that the user is at the predetermined distance from the display screen; and receiving input from the user in response to the material presented on the display screen. The material presented on the display screen may be for assessing at least one characteristic of the user's vision.

In some embodiments, the mobile device may be held against an approximately vertical surface and the camera and the display screen may be located on a same side of the mobile device.

In some aspects, the method may include estimating at least one physical length feature of the user and determining a current distance from the user to the display screen of the mobile device based on a focal length of the camera, the at least one image, and the at least one physical length feature. The user may be interactively guided to the predetermined distance from the display screen based on the current distance.

In some aspects, the at least one physical length feature may include a physical pupillary distance ("PD") of the user.

In some aspects, the physical PD of the user is estimated based on at least one a predetermined constant value based on physical PDs of a population; a combination of a predetermined physical iris diameter based on physical iris diameters of a population, a measured iris diameter in pixels in the at least one image, and a measured PD of the user in the at least one image; a depth map that is aligned with the at least one image of the user; and an object that is in the at least one image and has a known physical size as a size reference.

In some aspects, the at least one image may include an image captured when the user is at the current distance from the display screen. Determining the current distance may include determining a pixel PD in pixels between pupils of the user in the image and calculating the current distance from the user to the display screen based on the focal length of the camera in pixels, the pixel PD in pixels, and the physical PD.

In some aspects, the at least one image may include a plurality of images each captured when the user is at the current distance from the display screen. Determining the current distance may include determining, in each of the plurality of images, a pixel PD in pixels between pupils of the user; determining, with respect to each of the plurality of images, an estimated current distance from the user to the display screen based on: the focal length of the camera in pixels, the pixel PD in pixels and the physical PD, to generate a plurality of estimated current distances; and calculating the current distance from the user to the display screen based on an aggregation of the plurality of estimated current distances, wherein the aggregation comprises computing an average, a weighted average, or a median based on the plurality of estimated current distances.

In some aspects, the at least one physical length feature may include a physical shoulder width ("SW") of the user.

In some aspects, the physical SW of the user is estimated based on at least one of a predetermined constant value based on physical SWs of a population; a depth map that is aligned with the at least one image of the user, and an object that is in the at least one image and has a known physical size as a size reference for the physical SW.

In some aspects, the at least one image may include an image captured when the user is at the current distance from the display screen. Determining the current distance may include determining a pixel SW in pixels of the user in the image and calculating the current distance from the user to the display screen based on: the focal length of the camera in pixels, the pixel SW in pixels and the physical SW.

In some aspects, the at least one image may include a plurality of images each captured when the user is at the current distance from the display screen. Determining the current distance may include determining, in each of the plurality of images, a pixel SW in pixels of the user; determining, with respect to each of the plurality of images, an estimated current distance from the user to the display screen based on: the focal length of the camera in pixels, the pixel SW in pixels and the physical SW, to generate a plurality of estimated current distances; and calculating the current distance from the user to the display screen based on an aggregation of the plurality of estimated current distances. The aggregation may include computing an average, a weighted average, or a median based on the plurality of estimated current distances.

In some aspects, the at least one image may include a first image capture when the user is at an initial distance from the display screen and a second image captured when the user is at the current distance from the display screen. The current distance may be larger than the initial distance and closer to the predetermined distance than the initial distance. Determining the distance may include determining, in the first image, a first length in pixels of a first feature of the user and a second length in pixels of a second feature of the user; calculating a first ratio between the second length and the first length; determining, in the second image, a third length in pixels of the second feature of the user; and calculating the current distance from the user to the display screen based on the focal length of the camera in pixels, the first ratio, the third length in pixels, and a physical length of the first feature.

In some aspects, the at least one image may include a first image captured when the user is at an initial distance from the display screen and a second image captured when the user is at the current distance from the display screen. The current distance may be larger than the initial distance and closer to the predetermined distance than the initial distance. Determining the current distance may include determining, in the first image, a first length in pixels of a first feature of the user and a plurality of second lengths each of which is in pixels of a respective one of second features of the user; calculating a respective ratio between each of the plurality of second lengths and the first length; determining, in the second image, a respective third length in pixels of each respective second feature of the user; determining, with respect to each respective second feature, an estimated current distance from the user to the display screen based on: the focal length of the camera in pixels, the respective ratio, the respective third length in pixels, and a physical length of the first feature, to generate a plurality of estimated current distances; and calculating the current distance from the user to the display screen based on an aggregation of the plurality of estimated current distances. The aggregation may include computing an average, a weighted average, or a median based on the plurality of estimated current distances.

In some aspects, the first feature may include a pupillary distance ("PD") of the user and the second features may include at least one of a shoulder width of the user, a head width of the user, a head height of the user, and a body height of the user.

In some aspects, the focal length of the camera may be predetermined based on an image of a reference object at a known distance from the display screen.

In some aspects, interactively guiding the user may include presenting, on the display screen, a first indication of the current distance between the user and the mobile device; providing a second indication to the user when the predetermined distance has been reached; providing an instruction to the user to move in a direction relative to the display screen; and providing an instruction to the user when the at least one physical length feature of the user is blocked in the at least one image.

In some aspects, the predetermined distance may be a distance in a predetermined range of distances and differs from a nominal distance. The method may include determining a first acuity score for the user based on input received from the user and determining an acuity correction calculation for the user based, at least in part, on a ratio of the nominal distance and the predetermined distance.

In another example, a non-transitory machine-readable medium may have machine-executable instructions embodied thereon. The machine-executable instructions, when executed by a processor, may cause the processor to perform a method. The method may include capturing at least one image of the user using a camera of a mobile device; interactively guiding the user to a predetermined distance from a display screen of the mobile device based on the at least one image; presenting material for assessing at least one characteristic of the user's vision on the display screen upon a determination that the user is at the predetermined distance from the display screen; and receiving input from the user in response to the material presented on the display screen.

In some aspects, the predetermined distance may be a distance in a predetermined range of distances and differs from a nominal distance. The method may include determining a first acuity score for the user based on input received from the user and determining an acuity correction calculation for the user based, at least in part, on a ratio of the nominal distance and the predetermined distance.

Additional novel features will be set forth in part in the description, which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities and combinations set forth in the detailed examples discussed below.

BRIEF DESCRIPTION OF THE FIGURES

The patent or application file contains at least one drawing executed in color. Copies of this patent or patent application publication with color drawing(s) will be provided by the Office upon request and payment of the necessary fee.

The accompanying drawings, which are incorporated herein and form a part of the specification, illustrate the aspects of the present disclosure and, together with the description, further serve to explain the principles of the aspects and to enable a person skilled in the pertinent art to make and use the aspects. The drawings are for illustration purposes only, show exemplary non-limiting embodiments, and are not necessarily drawn to scale.

FIG. 1A illustrates an exemplary environment for conducting a vision test for a user using a mobile device, in accordance with some embodiments of the present disclosure.

DETAILED DESCRIPTION

Figure 1B:
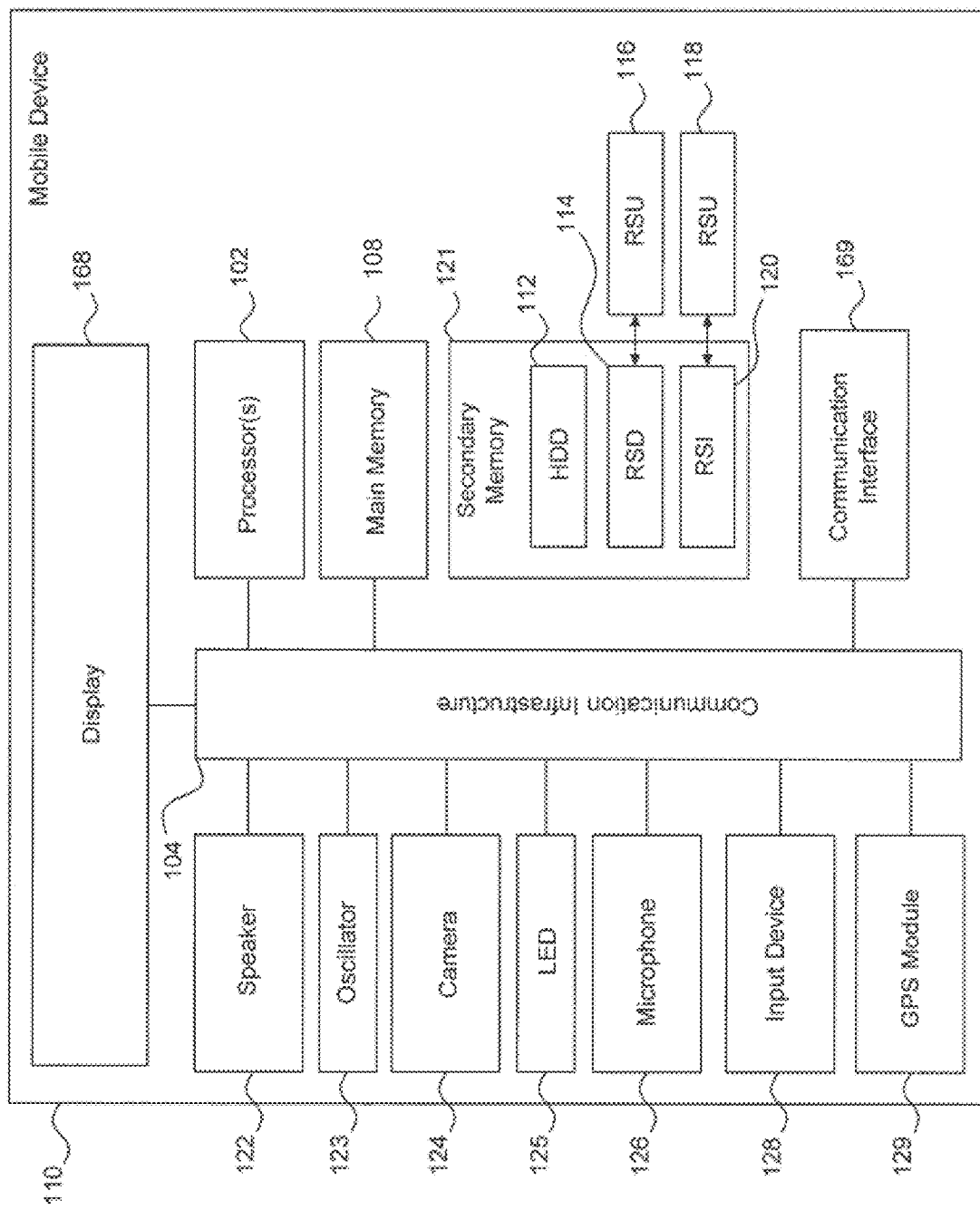
FIG. 1B illustrates one example of an architecture of a mobile device, in accordance with some embodiments of the present disclosure.

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

As used herein, the term "about" or "approximately" is intended to qualify the numerical values that it modifies, denoting such a value as variable within a margin of error. When no particular margin of error (such as, for example, standard deviation to a mean value) is recited, the term "about" or "approximately" means plus or minus 10% of the numerical value of the number with which it is being used. For example, "about 50%" means in the range of 45% to 55%. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about" or "approximately," it will be understood that the particular value forms another embodiment. It will be further understood that the endpoints of each of the ranges are significant both in relation to the other endpoint, and independently of the other endpoint.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise.

The present disclosure provides methods and systems for conducting a vision test for a user based on a mobile device. In some embodiments, a vision test app is installed on a mobile device (e.g., a smartphone) of the user to instruct the user on the vision test. Following an instruction from the test app or the smartphone, the user may first put the smartphone against a vertical surface to keep the smartphone vertically positioned. The test app may estimate the distance from the phone to the user and interactively guide the user to a predetermined target distance from the phone, e.g. 10 feet or 3.3 meters, for conducting the vision test. Because users tend to move in increments of steps or half-steps, it may be difficult for a user to move to an exact distance or desired position. In some embodiments, the predetermined target distance may be a predetermined target zone, which may extend in one or more directions from the desired distance. For example, the target distance may be 10 feet, and the target zone may be from 9-11 feet (e.g., a one-foot radius around the target distance). One of ordinary skill in the art will understand that the target zone may be greater or smaller than one foot. As described herein, the test app may be configured to adjust an acuity score if a user is within a target zone, but is not located at the target distance.

Once the user reaches the target distance, the test app may display testing material, e.g., optotypes, for the user to read. The test app may record the user's responses, which may be subsequently reviewed by a doctor or the app itself. The testing process may be configured to ensure that the user is located at the target distance (e.g., 10 feet or 3.3 meters) or located within a target zone that is located at a distance from the phone when conducting the vision test. In one embodiment, the front-facing camera of the phone may capture an image of the user, and computer vision may be used to estimate the user's distance from the phone. In one example, the user's pupillary distance may serve as a scale reference, and the user's distance from the phone can be estimated based on the pupil locations in the captured image and the scale reference. In another example, the user's distance from the phone can be estimated by measuring a ratio between the user's pupillary distance and other length features on the user's body, such as the width of the user's shoulders in the captured image.

In some embodiments, another vision test app may be installed on a mobile device (e.g. a smartphone) of a user to instruct the user on a vision test. Following an instruction from the test app or the smartphone, the user positions at a target distance (e.g., 5 feet or 1.65 meters) from a mirror and holds the smartphone against one of the user's eyes with a display screen of the phone facing outward. In some embodiments, the user may be positioned within a target zone, which may include distances greater and/or less than the target distance. The phone may present letters on the display screen. With the uncovered eye, the user reads the letters reflected in the mirror for vision test. The testing process may be configured to ensure that the user is at a specified target distance and/or within a target zone from the mirror. The closer the user is to the specified target distance, such as, for example, approximately 5 feet or approximately 1.65 meters from the mirror, the more accurate the vision test results will be. However, as noted above and described in greater detail herein, the test app may be configured to determine a visual acuity correction if the user is positioned within the target zone, but is not positioned exactly at the target distance. In some embodiments, the acuity correction calculation is applied after a user performs the acuity test, but prior to a clinician reviewing a score of the acuity test. However, one of ordinary skill in the art will understand that the time of when the acuity correction calculation is performed may be varied.

In one embodiment, the user's distance may be estimated by having the phone display a specific pattern and using the phone's front-facing camera (which is pointed toward the mirror) to capture an image of the pattern's reflection. When a physical size of the pattern and the camera's focal length are known, the test app can estimate the size of the pattern in the image to determine the user's distance from the mirror. By continuously detecting the user's distance from the mirror, the mobile device can interactively guide the user to the correct position (e.g., exactly at the target distance or within a target zone) for vision test.

Additional novel features will be set forth in part in the description, which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities and combinations set forth in the detailed examples discussed below.

FIG. 1A illustrates an exemplary environment 100 for conducting a vision test for a user using a mobile device 110, according to an embodiment of the present disclosure. As shown in FIG. 1A, the exemplary environment 100 may include a user 150 standing in a venue and facing a mobile device 110 positioned vertically. In some embodiments, the mobile device 110 may be held against a vertical surface, e.g., a wall 180. In other embodiments, the mobile device 110 may be fixed by a supporting mechanism, a holding mechanism, a pulling mechanism, or any fixing mechanism to make the mobile device 110 positioned in a vertical orientation. In other embodiments, the mobile device 110 may be positioned in a horizontal orientation or diagonal orientation. In some embodiments, an accelerometer and/or a gyroscope in the mobile device 110 may be utilized to assess whether the mobile device 110 is in a suitable orientation, e.g. vertically, horizontally or diagonally.

As shown in FIG. 1A, the mobile device 110 may include a camera 124 and a display screen 168. The camera 124 and the display screen 168 may be located on a same side of the mobile device 110. The mobile device 110 may capture an image of the user using the camera 124, and interactively guide the user 150 to a predetermined distance D1 from the display screen 168 based on an analysis of the image. In some embodiments, the predetermined distance D1 may be about 10 feet or about 3.3 meters.

After determining that the user 150 is at the predetermined distance D1 (or within the target zone) from the display screen 168, the mobile device 110 may present testing material 170 on the display screen 168. Each item of the material 170 presented on the display screen 168 may have a size for assessing at least one characteristic of the user's vision. In some embodiments, the size of the presented items (e.g., optotypes) may be determined based on the user's estimated distance from the display screen 168. When the user is not at a target distance from the display screen 168, the presented items can be sized to subtend a prescribed visual angle, e.g., 5 arc minutes. The mobile device 110 may then receive input from the user 150 in response to the material 170 presented on the display screen 168 and record the input for vision test of the user 150.

In various embodiments, the mobile device 110 may include any mobile device capable of capturing images and displaying characters. Examples of mobile devices include, but are not limited to, mobile or cellular phones, smart phones, personal digital assistants ("PDAs"), laptop computers, tablet computers, music players, smart eyeglasses, smart wristwatch, and e-readers, to name a few possible devices.

FIG. 1B is a block diagram of one example of an architecture of mobile device 110. As shown in FIG. 1B, mobile device 110 may include one or more processors, such as processor(s) 102. Processor(s) 102 may be any central processing unit ("CPU"), microprocessor, micro-controller, or computational device or circuit for executing instructions. Processor(s) may be connected to a communication infrastructure 104 (e.g., a communications bus, crossover bar, or network). Various software embodiments are described in terms of this exemplary mobile device 110.

As shown in FIG. 1B, the mobile device 110 may include a display 168 that displays graphics, video, text, and other data received from the communication infrastructure 104 (or from a frame buffer not shown) to a user (e.g., a subscriber, commercial user, back-end user, or other user). Examples of such displays 168 include, but are not limited to, LCD screens, OLED display, capacitive touch screen, and a plasma display, to list only a few possible displays. Mobile device 110 also may include a main memory 108, such as a random access ("RAM") memory, and may also include a secondary memory 110. Secondary memory 121 may include a more persistent memory such as, for example, a hard disk drive ("HDD") 112 and/or removable storage drive ("RSD") 114, representing a magnetic tape drive, an optical disk drive, solid-state drive ("SSD"), or the like. In some embodiments, removable storage drive 114 may read from and/or writes to a removable storage unit ("RSU") 116 in a manner that is understood by one of ordinary skill in the art. Removable storage unit 116 represents a magnetic tape, optical disk, or the like, which may be read by and written to by removable storage drive 114. As will be understood by one of ordinary skill in the art, the removable storage unit 116 may include a tangible and non-transient machine-readable storage medium having stored therein computer software and/or data.

In some embodiments, secondary memory 110 may include other devices for allowing computer programs or other instructions to be loaded into mobile device 110. Such devices may include, for example, a removable storage unit ("RSU") 118 and a corresponding interface ("RSI") 120. Examples of such units 118 and interfaces 120 may include a removable memory chip (such as an erasable programmable read only memory ("EPROM")), programmable read only memory ("PROM")), secure digital ("SD") card and associated socket, and other removable storage units 118 and interfaces 120, which allow software and data to be transferred from the removable storage unit 118 to mobile device 110.

Mobile device 110 may also include a speaker 122, an oscillator 123, a camera 124, a light emitting diode ("LED") 125, a microphone 126, an input device 128, an accelerometer (not shown), and a global positioning system ("GPS") module 129. Examples of camera 124 features include, but are not limited to optical image stabilization ("OIS"), larger sensors, bright lenses, 4K video, optical zoom plus RAW images and HDR, "Bokeh mode" with multi lenses and multi-shot night modes. Camera 124 may comprise one or more lenses with different functions. By way of example, camera 124 may include an ultra-wide sensor, telephoto sensor, time of flight sensor, macro sensor, megapixel ("MP") sensor, and/or a depth sensor. Camera 124, as described herein, is not limited to a single camera. Camera 124 may include a camera system that includes multiple different types of cameras, sensors, etc. By way of example, Apple® released a TrueDepth® camera system that includes a 7 MP front-facing "selfie" camera, infrared emitter, infrared camera, proximity sensor, ambient light sensor, flood illuminator, and dot projector that cooperate to obtain depth map and associated image. In other words, camera 124 of mobile device 110 may have multiple sensors, cameras, emitters, or other associated components that work as a system to obtain image information for use by mobile device 110.

Examples of input device 128 include, but are not limited to, a keyboard, buttons, a trackball, or any other interface or device through which a user may input data. In some embodiments, input device 128 and display 168 may be integrated into the same device. For example, display 168 and input device 128 may be touchscreen through which a user uses a finger, pen, and/or stylus to input data into mobile device 110.

Mobile device 110 also may include one or more communication interfaces 169, which allows software and data to be transferred between mobile device 110 and external devices such as, for example, another mobile device, or a computer that may be locally or remotely connected via Wi-Fi or Internet. Examples of the one or more communication interfaces 169 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 169 may also include a wireless interface configured for short-range communication, such as near field communication ("NFC"), Bluetooth, or other interface for communication via another wireless communication protocol.

Software and data transferred via the one or more communications interfaces 169 may be in the form of signals, which may be electronic, electromagnetic, optical, or other signals capable of being received by communications interfaces 169. These signals may be provided to communications interface 169 via a communications path or channel. The channel may be implemented using wire or cable, fiber optics, a telephone line, a cellular link, a radio frequency ("RF") link, or other communication channels.

In this application, the terms "non-transitory computer program medium" and "non-transitory computer readable medium" refer to media such as removable storage units 116, 118, or a hard disk installed in hard disk drive 112. These computer program products may provide software to mobile device 110. Computer programs (also referred to as "computer control logic") may be stored in main memory 108 and/or secondary memory 110. Computer programs may also be received via the one or more communications interfaces 169. Such computer programs, when executed by a processor(s) 102, enable the mobile device 110 to perform the features of the methods and systems discussed herein.

Embodiments of the subject matter described in this specification can be implemented in a system that includes a back end component, e.g., as a data server, or that includes a middleware component, e.g., an application server, or that includes a front end component (e.g., the mobile device 110) having a graphical user interface or a Web browser through which a user can interact with an implementation of the subject matter described is this specification, or any combination of one or more such back end, middleware, or front end components. The components of the system can be interconnected by any form or medium of digital data communication, (e.g., a communication network). The communication network may include one or more communication networks or media of digital data communication. Examples of the communication network include a local area network ("LAN"), a wireless LAN, a RF network, a NFC network, (e.g., a "Wi-Fi" network), a wireless Metropolitan Area Network ("MAN") connecting multiple wireless LANs, NFC communication link(s), and a wide area network ("WAN"), e.g., the Internet and combinations thereof. In accordance with various embodiments of the present disclosure, the communications network may include the Internet and any publicly accessible network or networks interconnected via one or more communication protocols, including, but not limited to, hypertext transfer protocol ("HTTP") and HyperText Transfer Protocol Secured ("HTTPS") and Secured Socket Layer/Transport Layer Security ("SSL/TLS") and transmission control protocol/internet protocol ("TCP/IP"). Communications protocols in accordance with various embodiments also may include protocols facilitating data transfer using radio frequency identification ("RFID") communications and/or NFC. Moreover, the communication network may also include one or more mobile device networks, such as a GSM or LTE network or a PCS network, allowing a mobile device to send and receive data via applicable communications protocols, including those described herein.

The present disclosure provides for methods to perform a vision test for a user using a single mobile device with no additional device. To ensure that the user is positioned a desired distance (e.g., 10 feet, 8-12 feet, etc.) from display (or display screen) of the mobile device (such as display 168) for the vision test, at least one physical length feature of the user may be estimated to determine a current distance from the user to the display of the mobile device. In one embodiment, the at least one physical length feature may include a physical pupillary distance ("PD") of the user.

In some embodiments, consider a subject or user with a PD p. The mobile device (such as mobile device 110) can capture an image of the subject using a camera (such as camera 124) with a focal length of f pixels. The distance between the subject's pupils in the captured image is P in pixels. Then, one can determine the user's distance d from the camera using the equation:

$$d = \frac{pf}{P}$$

This equation can be derived, for example, as follows. In order to relate the distance d between the camera and the subject, the subject's PD p, and the distance P between the pupils in the image, a pinhole model of the camera may be considered as below:

$$z_c \begin{bmatrix} u \\ v \\ 1 \end{bmatrix} = K \begin{bmatrix} R & T \end{bmatrix} \begin{bmatrix} x \\ y \\ z \\ 1 \end{bmatrix},$$

where (x, y, z) represents a point in world coordinates; (u, v) represents a corresponding point in image coordinates; K is the 3×3 camera intrinsic matrix given by $$K = \begin{bmatrix} f & 0 & o_x \\ 0 & f & o_y \\ 0 & 0 & 1 \end{bmatrix},$$

where f is the focal length and $(o_x, o_y)$ is the principal point. In the case of a mobile device, such as a smartphone, the intrinsic parameters can be obtained from the operating system or a calibration procedure, such as the one described in Z. Zhang (2000), "A flexible new technique for camera calibration", IEEE Transactions on Pattern Analysis and Machine Intelligence, 22(11):1330-1134, which is incorporated herein by reference in its entirety. [R T] is the 3×4 extrinsic matrix in which R is a 3×3 rotation matrix that describes the camera's orientation and T is a 3×1 column vector that describes the camera's position; and $z_c$ is an arbitrary constant that permits the use of homogeneous coordinates.

If one orients the camera axis along the positive z-axis and uses a camera-centered coordinate system, one can obtain R=I and T=[0 0 0]$^T$. If the camera is positioned at a distance d from a subject and the optical axis bisects the line connecting the subject's pupils, then the pupils reside at world coordinates (−p/2, 0, d) and (p/2, 0, d). Plugging into the pinhole camera equation above, one can obtain $$z_c \begin{bmatrix} u_R & u_L \\ v_R & v_L \\ 1 & 1 \end{bmatrix} = d \begin{bmatrix} -\frac{pf}{2d} + o_x & \frac{pf}{2d} + o_x \\ o_y & o_y \\ 1 & 1 \end{bmatrix}$$

$$= \begin{bmatrix} f & 0 & o_x \\ 0 & f & o_y \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} -p/2 & p/2 \\ 0 & 0 \\ d & d \\ 1 & 1 \end{bmatrix},$$

where $(u_R, v_R)$ are the image coordinates of the right pupil and $(u_L, v_L)$ are the image coordinates of the left pupil. The distance between the pupils in the image is given by $$P = \sqrt{(u_L - u_R)^2 + (v_L - v_R)^2}$$
$$= \sqrt{\left[\left(\frac{pf}{2d} + o_x\right) - \left(-\frac{pf}{2d} + o_x\right)\right]^2 + (o_y - o_y)^2}$$
$$= \frac{pf}{d}$$

Rearranging the terms, one can obtain $$d = \frac{pf}{P}.$$

In some embodiments, the distance's distance d can be determined using a different feature (e.g., the shoulder width) in the captured image, denoted as X This may be because one can detect that feature more reliably than the PD at the relevant distance. In this case, a two-step process may be used. First, Image 1 may be captured, from a distance considered to be close enough for the pupils and the additional feature to be easily localized. The mobile device can extract or determine the distance between the pupils $P_1$ and the additional feature length $X_1$ from Image 1. The ratio between the features is given by $$r = \frac{X_1}{P_1}.$$

The mobile device can capture a subsequent image, Image 2, from a distance considered to be close to the target distance for the vision test. The mobile device can extract or determine the additional feature length $X_2$ from Image 2. The distance's distance d can then be determined by:

$$d = \frac{rpf}{X_2} = \frac{X_1 pf}{P_1 X_2}.$$

This process can be repeated for multiple additional features (Y, Z, etc.) and the resulting distance estimates can be combined, perhaps with a weighting derived from the perceived confidence in the feature measurements.

In one example, a subject has a PD of p=60 mm and a camera of the mobile device has a focal length f=1400 pixels. The subject may be captured in close-in Image 1. Based on Image 1, the distance between the pupils $P_1$=105 pixels and the additional feature length (shoulder width) $X_1$=525 pixels, which correspond to a distance of $d_1$=800 mm and a shoulder width of x=300 mm, respectively, giving a feature ratio value r=5. The subject may move back and away from the camera, and Image 2 may be captured accordingly. Based on Image 2, the additional feature length (shoulder width) $X_2$=127.3 pixels. Plugging into the equation above, one can find the distance's distance d=(5×60× 1400)/127.3=3300 mm.

Figure 2:
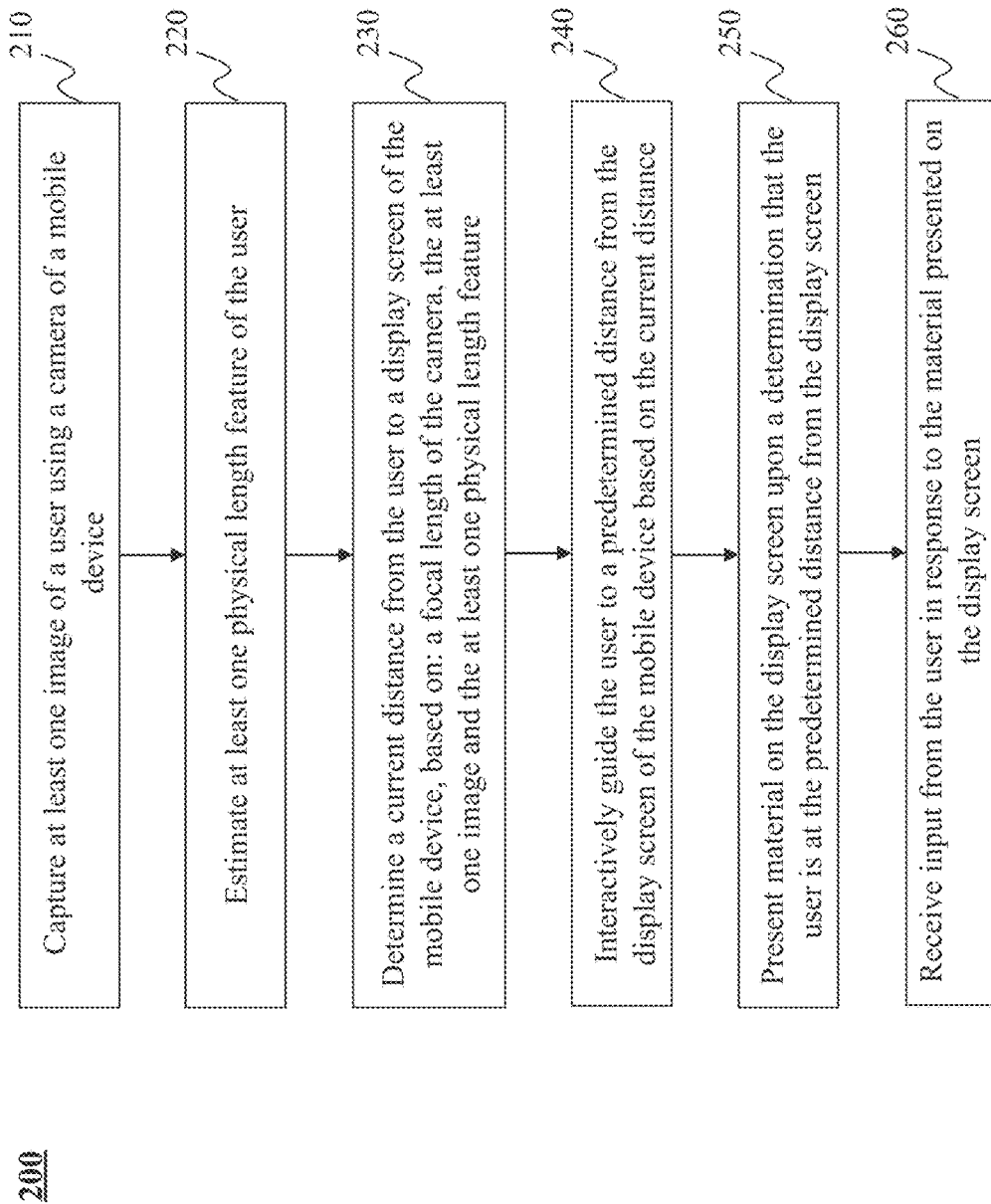
FIG. 2 is a flowchart of an exemplary process for conducting a vision test for a user using a mobile device, in accordance with some embodiments of the present disclosure.

FIG. 2 is a flowchart of an exemplary process 200 for conducting a vision test for a user using a mobile device, e.g., the mobile device 110 in FIGS. 1A and 1B, in accordance with some embodiments of the present disclosure.

At operation 210, at least one image of a user may be captured using a camera of a mobile device.

At operation 220, at least one physical length feature of the user may be estimated.

At operation 230, a current distance from the user to a display screen of the mobile device may be determined, based on: a focal length of the camera, the at least one image, and the at least one physical length feature.

At operation 240, the user may be interactively guided to a predetermined distance from the display screen of the mobile device based on the current distance. As noted above, the predetermined distance may be a target distance or a distance within a target zone.

At operation 250, material may be presented on the display screen upon a determination that the user is at the predetermined distance from the display screen. In some embodiments, the material presented on the display screen may have a size for assessing at least one characteristic of the user's vision.

At operation 260, input from the user may be received in response to the material presented on the display screen; and the input is recorded for vision test of the user. The order of the operations shown in FIG. 2 may be changed according to different embodiments of the present disclosure.

In some embodiments, the user's distance may be estimated based on three steps: (1) estimation of PD, (2) estimation of body features, and (3) estimation of distance.

In some embodiments, in order to connect image-derived length features to the distance from the camera to the subject, at least one feature with a known physical length may be used. The PD may be a natural candidate for this role because pupils are a distinct feature that is straightforward to localize in images, and there are several ways of estimating PD.

A first PD estimation technique may be based on constant pupillary distance, assuming that all users have the same PD. For example, a population mean for PD is approximately 62.5 mm and the population standard deviation is 3.5 mm. So one can use the population mean as the user's PD, and estimate the impact that this assumption has on the distance estimate.

A second PD estimation technique may be based on an assumption that an anatomical feature is the same across the population. But in this case, the anatomical feature may be the diameter of the iris. In one example, a photograph or image of the user may be captured and computer vision may be used to localize and segment the iris in the image. Then, an assumption that the iris diameter corresponds to the population mean of 12 mm is used to establish a proportionality relationship between pixels in the image and millimeters. This proportionality then may be used to convert the distance between the pupils in pixels to the PD in millimeters. The population standard deviation of 0.5 mm enables estimating the impact of the assumption of constant iris diameter on the distance estimate.

A third PD estimation technique may be using a depth-sensing camera to capture a depth map that is aligned with a two-dimensional ("2D") image. See, e.g., U.S. Patent Application Publication No. 2021/0393121, entitled "System and method for measuring pupillary distance and uses thereof," which is incorporated herein by reference in its entirety. Computer vision may be used to localize the pupils, and the depth map may be used to localize the pupils in three-dimensional ("3D") world coordinates. An average error of the depth map method relative to an established ground truth is about 0.75 mm.

Another PD estimation technique may rely on using a credit card as a size reference. Unlike the PD estimation methods mentioned above, the variability attributable to this method may be harder to estimate. There are several possible sources of variability, such as the card not being at the same depth as the eyes, the card not being parallel to the image plane, and challenges of segmenting the card. In some embodiments, the card image may be reviewed by an order-processing associate who can evaluate the quality of the image and accept or reject it.

The variability associated with these methods is summarized in Table 1 below.

TABLE I

| Method | PD standard deviation (mm) | Distance standard deviation at 10 feet (feet) | Distance standard deviation (percent) |
| --- | --- | --- | --- |
| Constant PD | 3.50 | 0.560 | 5.60% |
| Constant iris diameter | 2.60 | 0.417 | 4.17% |
| depth map | 0.75 | 0.120 | 1.20% |

Figure 3:
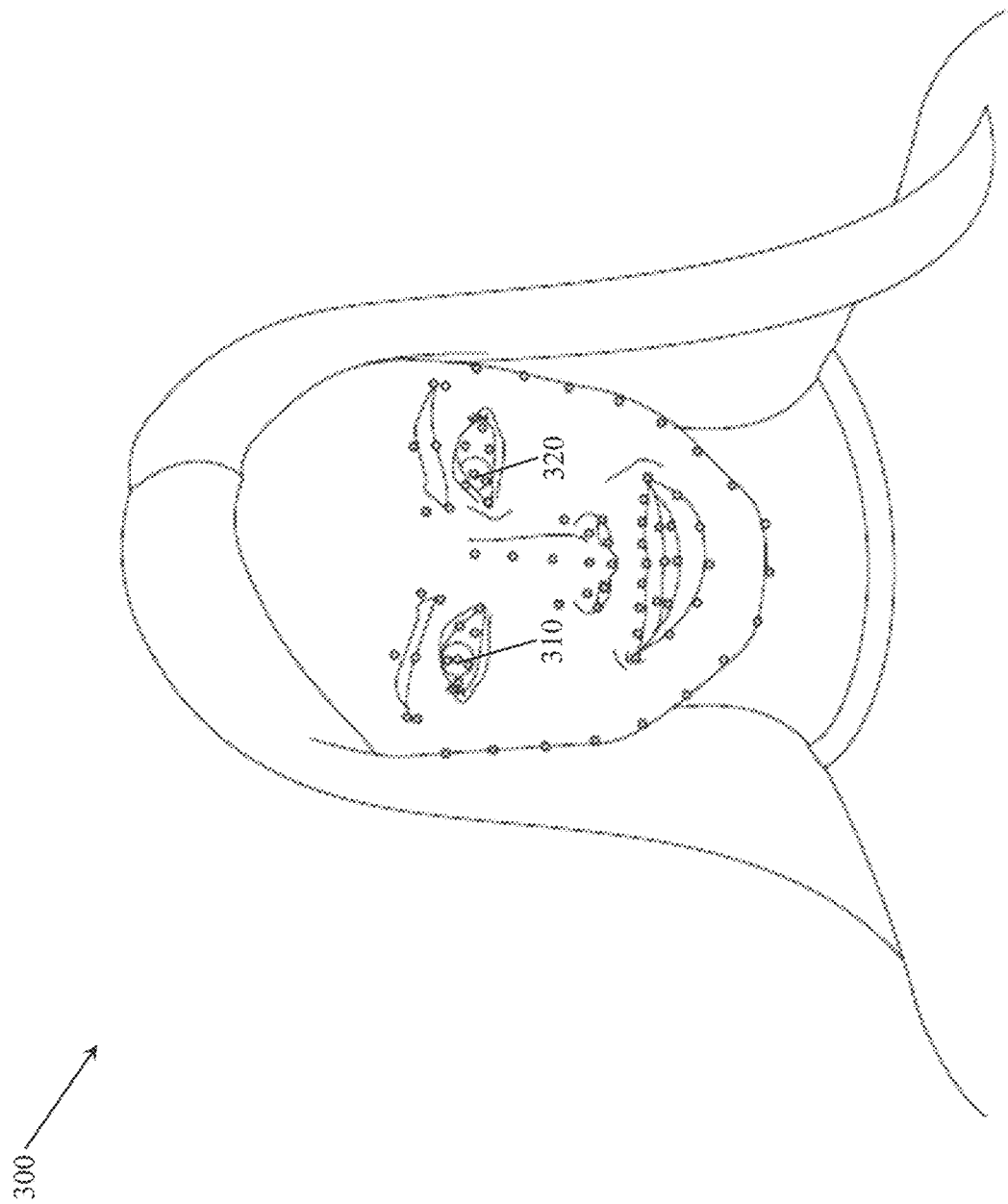
FIG. 3 illustrates an exemplary method for facial feature localization for a user, in accordance with some embodiments of the present disclosure.
Figure 4:
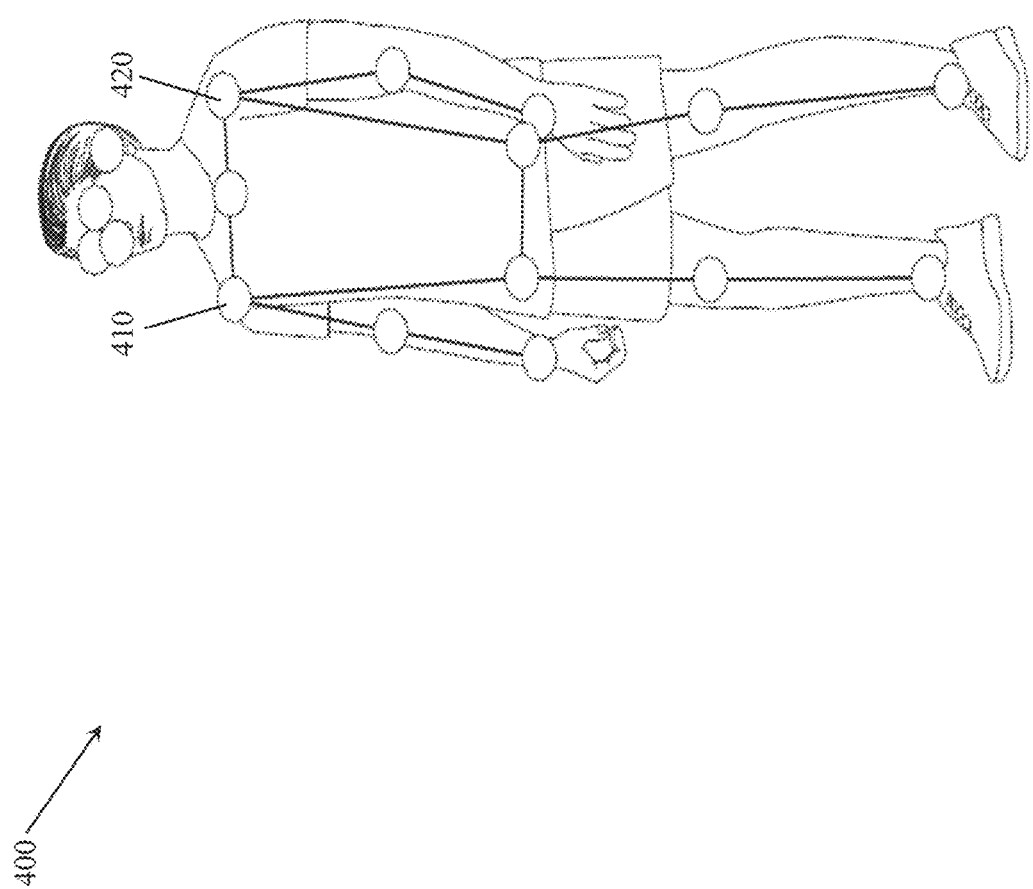
FIG. 4 illustrates an exemplary method for body feature localization for a user, in accordance with some embodiments of the present disclosure.

Estimation of the user's body features may be used in a method of estimating the user's distance. In recent years, several software libraries for localizing body features have become available. The mobile device can localize one or more body features of a subject, e.g., pupillary distance, shoulder width, head height, head width, body height, etc., using the software libraries. In some embodiments, the libraries may be based on convolutional neural networks, although their underlying implementations differ. FIG. 3 illustrates an exemplary method for facial feature localization, in accordance with some embodiments of the present disclosure. FIG. 4 illustrates an exemplary method for body feature localization, in accordance with some embodiments of the present disclosure.

One characteristic that may be common to all of the feature localization libraries is that even when the subject stands still, there may be small variations in the estimated locations of the body features as well as the distances between those features. For this reason, the mobile device may be configured to aggregate multiple measurements into a single value, to mitigate variability. This aggregation could take the form of simple averaging or calculating the median value. This may be the case for both the feature ratio r and the final distance d. For a nominal frame rate of 30 fps, an aggregation time of 1 second, or 30 frames, can result in significant mitigation of variability.

One can use modeling to understand the behavior of the disclosed method, with a few simplifying assumptions as below. The PD p may be known. Observed length features may be modeled as normal random variables with their mean at the nominal length and their standard deviation proportional to the mean. The distance between the pupils P may have a mean of $\mu_p$ and a standard deviation of $\sigma_p = c_p \mu_p$. The distance between the shoulders X may have a mean of $\mu_x$ and a standard deviation of $\sigma_x = c_x \mu_x$. The ratio between the subject's shoulder width ("SW") and PD r may be estimated by averaging observations of P and X over at distance $d_1$ over $N_1$ frames and computing the ratio of the averages. The subject's final distance d may be estimated by averaging observations over $N_2$ frames.

One can find the properties of the estimate of distance, $\hat{d}$. For example, one can evaluate the standard deviation as a fraction of the target distance, $\sigma \hat{d}/d$, using a propagation of uncertainty approach.

First, the PD-only version of distance estimation may be considered. In this case, the only source of variability may be the estimate of the distance between the pupils at the target distance. One can find that $$\frac{\sigma_{\hat{d}}}{d} \approx \sqrt{\frac{1}{N_2}\left(\frac{\sigma_P}{\mu_P}\right)^2} = \frac{c_P}{\sqrt{N_2}}.$$

Next, one can consider a version of distance estimation, where the mobile device may estimate the ratio between the SW and the PD at a distance $d_1$ and may estimate the distance between the shoulders at the target distance. The ratio step may introduce additional sources of variability that may be taken into account. The overall variability can be calculated as:

$$\frac{\sigma_{\hat{d}}}{d} \approx \sqrt{\frac{1}{N_1}\left(\frac{\sigma_{P_1}}{\mu_{P_1}}\right)^2 + \frac{1}{N_1}\left(\frac{\sigma_{X_1}}{\mu_{X_1}}\right)^2 + \frac{1}{N_2}\left(\frac{\sigma_{X_2}}{\mu_{X_2}}\right)^2}$$

$$\approx \sqrt{\left(\frac{c_P}{N_1}\right)^2 + \left(\frac{c_X}{N_1}\right)^2 + \left(\frac{c_X}{N_2}\right)^2}.$$

In the case where $c_P = c_N$ and $N_1 = N_2$, the PD-only method estimate may have less variability than the SW method because all of the estimated quantities may have the same variability, and the PD-only method may have fewer estimated quantities. However, in a situation where $c_X < c_P$ and $N_1 > N_2$, the SW method can have lower variability. In addition, if the pupils are not detectable at distance d, then the SW method may provide an option where one would otherwise not have one in the PD-only method. In all of these cases, estimates of the random variables in question may be assumed to be unbiased, meaning that the mean of the estimate may equal the mean of the random variable. This may result in an unbiased estimate of distance, which may not occur in practice. The above modeling does not account for the possibility that a feature localization library will systematically mis-localize body features, and that the nature of the mis-localization may vary with distance.

Three test videos were analyzed from two subjects to determine the combination of features and feature detection libraries for the disclosed method and test application. To determine the field of view, and in turn the focal length, of the subject's camera on the mobile device (in this case, a smartphone), the mobile device first captured an image of a reference object at a known distance from the image. The mobile device then captured a video with two segments. In the first segment, the subjects stood approximately 0.8 meters from the camera so that both their pupils and shoulders were in the field of view. In the second segment, they stood at the target distance of 3.3 meters, which was marked with the aid of a laser measure.

The videos were subsequently processed using the PD-only and SW algorithms in order to measure the distance estimation error at the target distance. To isolate the effects of the features and feature detection libraries, the subject's self-reported PDs were used. The testing was carried out on a desktop platform with the understanding that localization performance on a mobile platform would be comparable. In all cases, test videos were broken up into sequences of single image frames, and the image frames were fed into executable software based on the libraries above. Individual feature locations were returned by the libraries, sometimes accompanied by a measure of the library's confidence in the feature's location. In cases where a confidence measure was provided, features with low confidence were discarded. If the points that comprise a length feature were available for a given frame, they were used to determine the length feature for that frame. The results are summarized in Table II below, which shows distance estimation error results for various combinations of features and feature estimation libraries. The two subjects are labeled A and B, where Subject B provided two recordings, labeled B1 and B2. Table cells are noted as *: 0-5%; : 5-10%; *: >10%.

TABLE II

| Library | Feature | A | B1 | B2 |
|---|---|---|---|---|
| Vision Framework face[1] | PD | −1.55* | −0.06* | −0.29* |
| Vision Framework body[2] | PD | −0.93* | 5.18** | 11.07*** |
| Vision Framework body | PD, SW | −10.71*** | 0.69* | 0.05* |
| Vision Framework body, face | PD, SW | −9.44** | 0.06* | −2.36* |
| MediaPipe BlazePose[3] | PD | −1.52* | −6.73** | −4.17* |
| MediaPipe BlazePose | PD, SW | −11.10*** | −12.75*** | −13.91*** |
| TensorFlow PoseNet[4] | PD | 34.25*** | 11.62*** | 4.13* |
| TensorFlow PoseNet | PD, SW | −8.31** | −8.25** | −14.88*** |

[1]See, e.g., https://developer.apple.com/documentation/vision/vndetectfacelandmarksrequest
[2]See, e.g., https://developer.apple.com/documentation/vision/vndetecthumanbodyposerequest
[3]See, e.g., https://google.github.io/mediapipe/solutions/pose.html
[4]See, e.g. https://www.tensorflow.org/lite/examples/pose_estimation/overview In general, the PD-only methods using Apple®'s Vision Framework face and Google's MediaPipe showed the most promise. Apple®'s Vision Framework body with shoulder features also provided encouraging results, even though one of the subject's shoulders was occluded by hair on video A.

The present disclosure provides for methods of distance estimation based on body features. There may be a few considerations that are worth highlighting and/or taking into account. One consideration may be that the selected feature detection library may be trained on data that do not accurately reflect the conditions under which the app will be used. This could encompass the appearance of the users or the environment in which they are using the app. To compensate for the deviation between the training and use, the app may be tested with a diverse sample of users under a variety of conditions. Another issue may be that body features could be occluded by hair or bulky garments, which can be mitigated by instructions to the users.

It may be challenging for a user to find a secure place to place a mobile device that also has 10 feet or 3.3 meters of space for the user to be able to move freely. Placing a mobile device at such distance from a user may also make it difficult for the user to hear audio instructions from the app or for the app to record their spoken responses. While computer vision may be used to localize precisely the reference feature in the scene, the feature could appear small and thus be difficult to localize at the distance of 3.3 meters.

Figure 5:
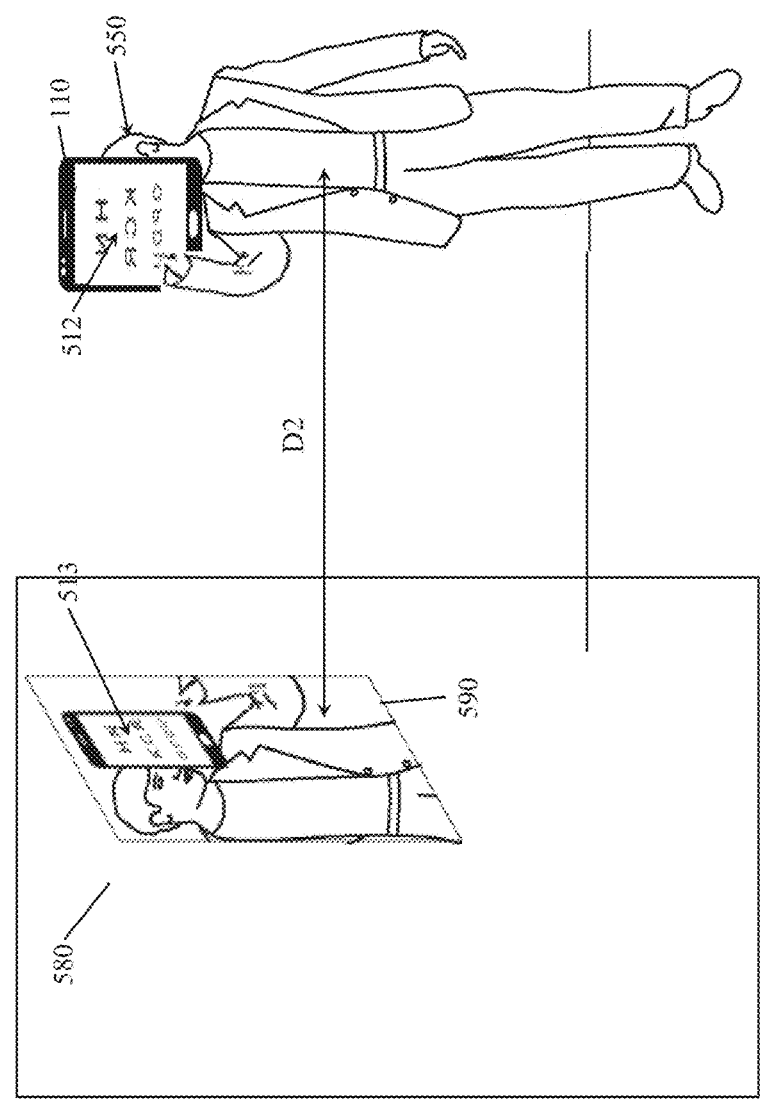
FIG. 5 illustrates another exemplary environment for conducting a vision test for a user using a mobile device, in accordance with some embodiments of the present disclosure.

The systems and methods disclosed herein may overcome these challenges by having the user hold the mobile device and view a reflection of the display in a mirror. FIG. 5 illustrates another exemplary environment 500 for conducting a vision test for a user using a mobile device, in accordance with some embodiments of the present disclosure. As shown in FIG. 5, the exemplary environment 500 may include a user 550 standing in a venue and holding a mobile device 510 vertically and in parallel to a mirror 590. In this example, the mirror 590 may be positioned vertically, e.g., against a wall 580. In some embodiments, the mirror 590 may be fixed by a supporting mechanism, a holding mechanism, a pulling mechanism, or any fixing mechanism to make the mirror 590 positioned vertically.

In various embodiments, the mobile device 510 may include any mobile device capable of capturing images and displaying characters. Examples of mobile devices include, but are not limited to, mobile or cellular phones, smart phones, personal digital assistants ("PDAs"), laptop computers, tablet computers, music players, smart eyeglasses, smart wristwatch, and e-readers, to name a few possible devices. In some embodiments, the mobile device 510 shown in FIG. 5 may have the same structure as the mobile device 110 shown in FIGS. 1A and 1B, and also may include a processor, a camera and a display screen. The camera and the display screen may be located on a same side of the mobile device 510. As such, when the mobile device 510 guides the user 550 to position in front of a mirror and cover one of the user's eyes using the mobile device 510 facing outward, all of the user 550, the camera and the display screen of the mobile device 510 may be facing the mirror 590 in front of the user 550.

The mobile device 510 may then capture an image of a reflection of the mobile device in the mirror 590 using the camera, and interactively guide the user 550 to a predetermined distance D2 from the mirror 590 based on an analysis of the image. In some embodiments, the predetermined distance D2 may be about 5 feet or about 1.65 meters. After determining that the user 550 is at the predetermined distance D2 from the mirror 590, the mobile device 510 may present testing material 512 on the display screen of the mobile device 510. Each item of the material 512 presented on the display screen may have a size for assessing at least one characteristic of the user's vision. In some embodiments, the size of the presented items (e.g., optotypes) may be determined based on the user's estimated distance from the mirror 590. When the user is not at a target distance from the mirror 590, the presented items can be sized to subtend a prescribed visual angle, e.g., 1 arc minutes, 5 arc minutes, or other visual angle. The mobile device 510 may receive input from the user 550 in response to the material presented on the display screen and reflected in the mirror 590 and may record the input for vision test of the user 550. The reflection 513 of the material 512 in the mirror 590 may be a mirror image of the material 512 presented on the display screen.

To ensure an accurate visual acuity result, the user may be guided to a predetermined position or at a specified distance from the display. The vision test requirements usually call for the user to be about 3.3 meters (or about 10 feet) from the display of the testing material. In the case where the display may be reflected in a mirror, the user may be 3.3/2=1.65 meters from the mirror, as the mirror doubles the user's effective distance. In one disclosed embodiment, a mobile device may display a reference pattern of a known size, and the camera of the mobile device may capture the pattern's reflection in the mirror. The focal length of the camera and the apparent size of the pattern can then be used to calculate the distance between the user and the mirror.

Figure 6:
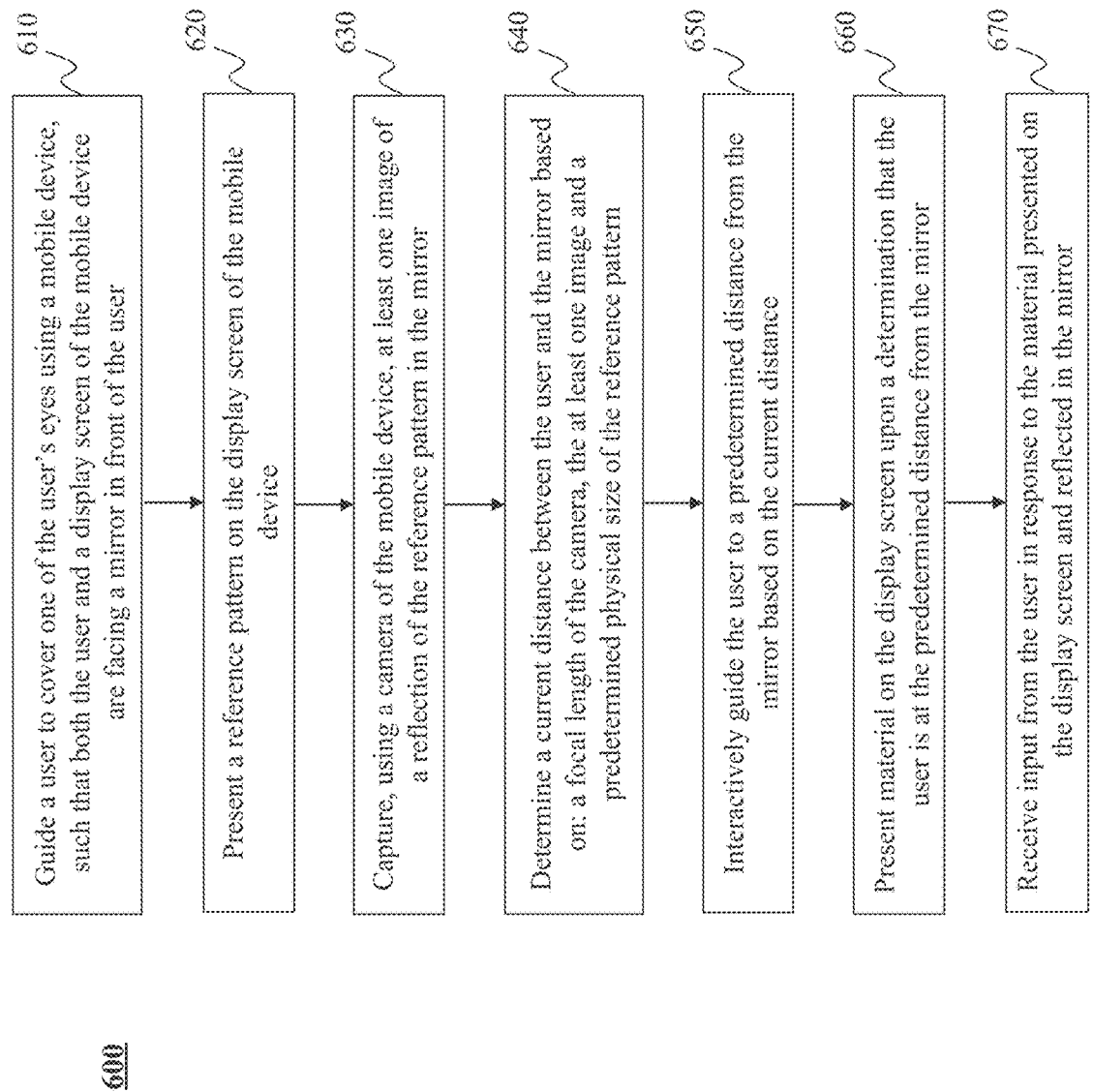
FIG. 6 is a flowchart of another exemplary process for conducting a vision test for a user using a mobile device, in accordance with some embodiments of the present disclosure.

FIG. 6 is a flowchart of another exemplary process 600 for conducting a vision test for a user using a mobile device, e.g., the mobile device 110 in FIGS. 1A and 1B, or the mobile device 510 in FIG. 5, in accordance with some embodiments of the present disclosure.

At operation 610, a user may be guided to cover one of the user's eyes using a mobile device, such that both the user and a display screen of the mobile device are facing a mirror in front of the user.

At operation 620, a reference pattern may be presented on the display screen of the mobile device.

At operation 630, at least one image of a reflection of the reference pattern in the mirror may be captured using a camera of the mobile device.

At operation 640, a current distance between the user and the mirror may be determined based on: a focal length of the camera, the at least one image, and a predetermined physical size of the reference pattern.

At operation 650, the user may be interactively guided to a predetermined distance from the mirror based on the current distance. As noted above, the predetermined distance may be a target distance or a distance or location within a target zone.

At operation 660, material may be presented on the display screen upon a determination that the user is at the predetermined distance from the mirror. In some embodiments, the material presented on the display screen may have a size for assessing at least one characteristic of the user's vision.

At operation 670, input from the user may be received in response to the material presented on the display screen and reflected in the mirror; and the input is recorded for vision test of the user. The order of the operations shown in FIG. 6 may be changed according to different embodiments of the present disclosure.

In some embodiments, determining the current distance may include preprocessing the reference pattern to generate a binary image including at least one candidate shape of the reference pattern; performing a localization of the reference pattern in the at least one image; and performing a segmentation of the reference pattern from the at least one image.

A reference pattern may be designed to present a distinctive reference pattern that is easy to pick out of a cluttered environment. The reference pattern may have well-defined boundaries that allow for precise segmentation. There are at least two types of reference patterns for real-time image processing and distance estimation. One example of a reference pattern may include a solid-colored static pattern. Another example of a reference pattern may include a dynamic pattern, which may cycle through several colors. Images of each pattern may be processed by a procedure tailored to that pattern.

One way to make the reference pattern distinctive may be to give it a color that is unlikely to appear in the scene. This characteristic, combined with the fact that the display screen is emitting rather than reflecting light, can make the pattern easy to segment from the background. In one embodiment, the mobile device may use a solid, aqua-colored pattern (corresponding to the RGB color (0, 255, 255)), surrounded by a 2 mm-wide black border. When the image is captured, the mobile device can compute a pixel-wise difference between the captured image and the reference color. The difference may be computed in the International Commission on Illumination L*A*B* ("CIELAB") color space. In this color space, the Euclidean distance between pairs of points corresponds to perceptual differences between their corresponding colors. Then, the difference image may be applied with an inverse threshold with a value of 25 (out of a maximum difference of 300) to generate a binary image of candidate shapes.

Figure 7:
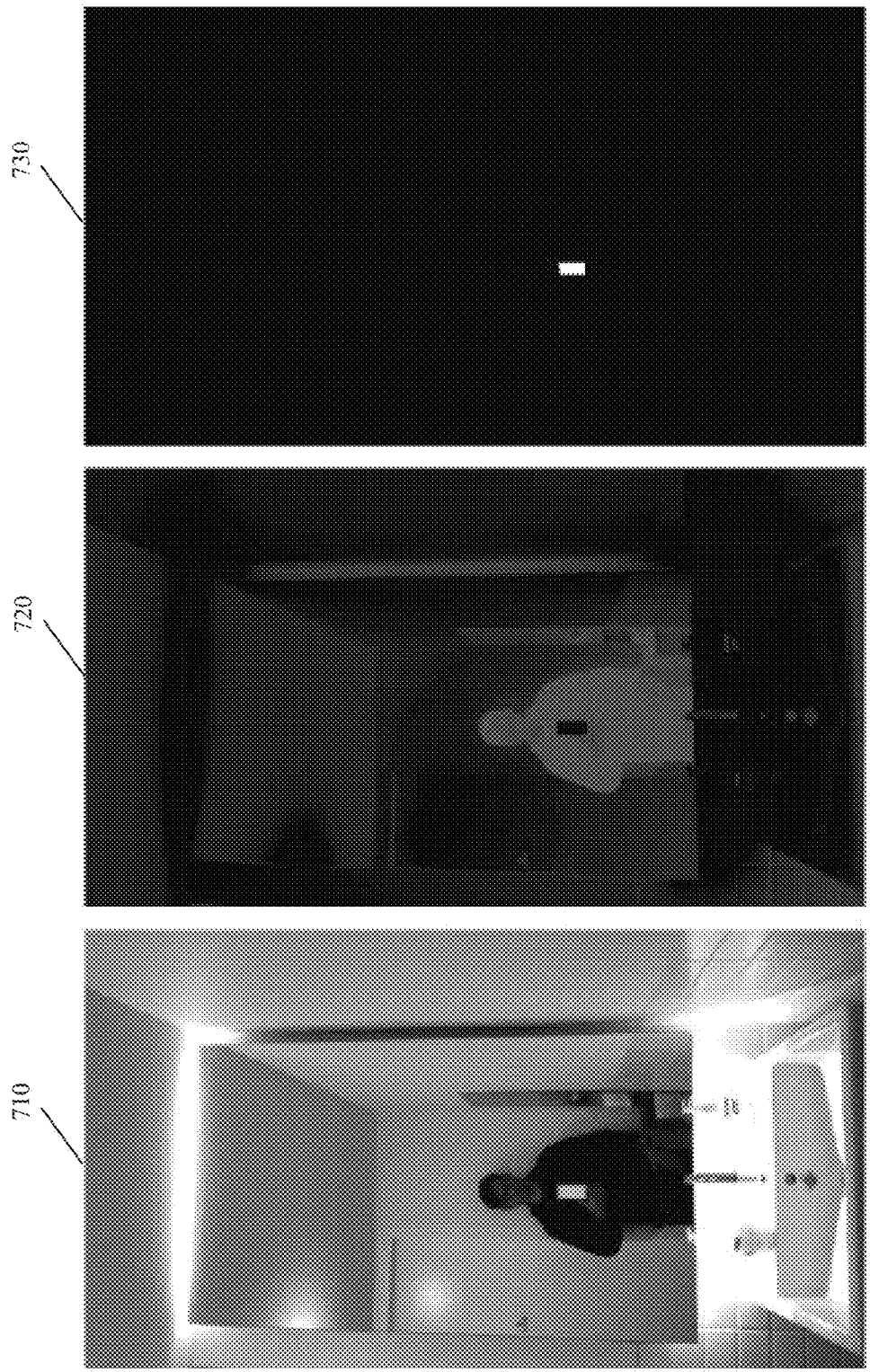
FIG. 7 illustrates exemplary images captured for preprocessing a static pattern, in accordance with some embodiments of the present disclosure.

FIG. 7 illustrates exemplary images captured for preprocessing a static pattern, in accordance with some embodiments of the present disclosure. As shown in FIG. 7, the image 710 may be an image of a user holding a phone displaying a solid-colored reference pattern; the image 720 shows a pixel-wise difference between image pixels and the reference color (RGB (0, 255, 255)), where the color scale goes from 0 (black) to the maximum difference of 300 (white); and the image 730 shows a result of inverse thresholding the image 720 with a threshold value of 25.

Figure 8:
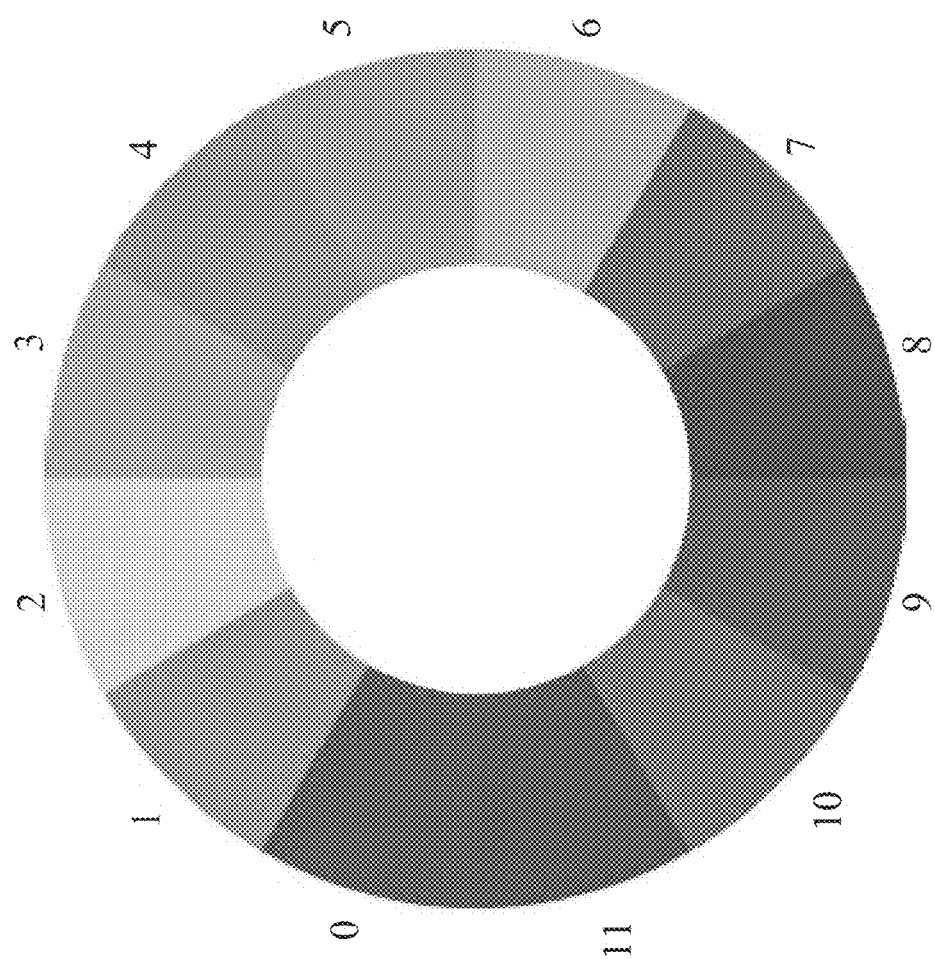
FIG. 8 illustrates an exemplary color cycle of a dynamic pattern, in accordance with some embodiments of the present disclosure.

Another way to make a pattern stand out in a cluttered scene may be to have the image vary over time in a predictable manner. In one embodiment, the mobile device may use a dynamic pattern that has a time-varying solid color background surrounded by a 2 mm-wide black border. In one embodiment, while the hue varies, the saturation and lightness may be set to the maximum value. In one embodiment, the dynamic pattern may cycle through 12 distinct frames at a frame rate of 30 frames per second, such that a full cycle of colors happens every 30/12=2.5 cycles per second. The RGB components of the frame colors are listed in Table III below, and the color cycle is illustrated in FIG. 8 with index number marked therein.

TABLE III

| Index | Red | Green | Green | Name |
|---|---|---|---|---|
| 0 | 255 | 0 | 0 | Red |
| 1 | 255 | 127 | 0 | Orange |
| 2 | 255 | 255 | 0 | Yellow |
| 3 | 127 | 255 | 0 | Chartreuse |
| 4 | 0 | 255 | 0 | Lime |
| 5 | 0 | 255 | 127 | Spring green |
| 6 | 0 | 255 | 255 | Aqua |
| 7 | 0 | 127 | 255 | Azure |
| 8 | 0 | 0 | 255 | Blue |
| 9 | 127 | 0 | 255 | Violet |
| 10 | 255 | 0 | 255 | Fuschia |
| 11 | 255 | 0 | 127 | Deep pink |

Figure 9:
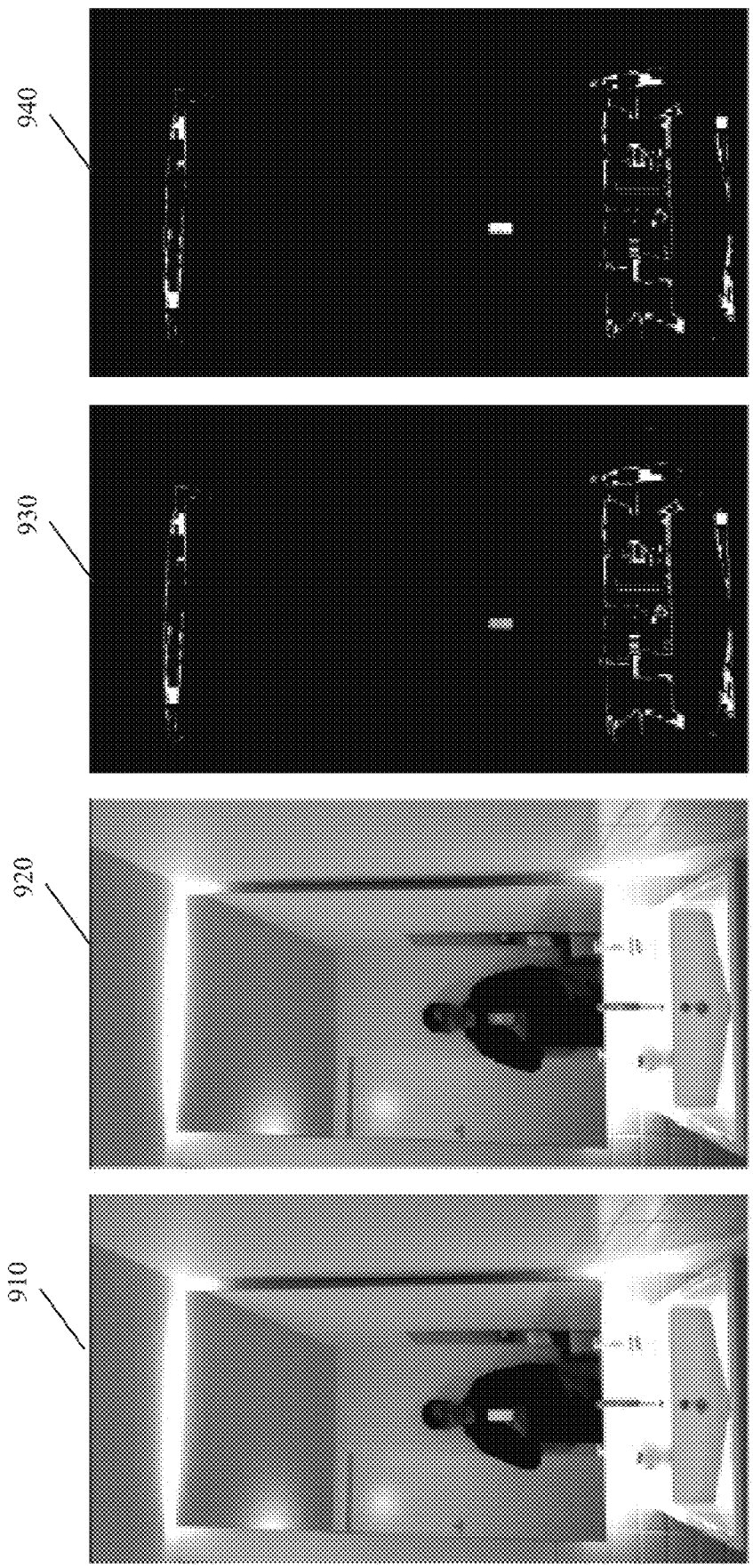
FIG. 9 illustrates exemplary images captured for preprocessing a dynamic pattern, in accordance with some embodiments of the present disclosure.

To localize the phone based on the dynamic pattern, the hue channel of the current image frame may be compared to an image frame from the past. The past frame may correspond to the color in the cycle that is complementary to the color in the current frame. In a dynamic pattern with 12 colors, the frame with a color complementary to the current frame may be 12/2=6 frames in the past, equivalent to the opposite side of the circle in FIG. 8. The hue difference between the complementary frames may be calculated (taking into account the circular nature of hue), and the result may be multiplied by the intensity channel of the current frame (scaled between 0 and 1), ensuring that regions that have a large hue difference and a strong intensity are selected. To find the candidate shapes, the gated hue difference values may be compared to a threshold with a value of 90°. Example results are given in FIG. 9, which illustrates exemplary images captured for preprocessing a dynamic pattern, in accordance with some embodiments of the present disclosure. The two images 910, 920 in FIG. 9 were captured at 6 frames apart, at opposite points in the color cycle. The image 930 shows a hue difference multiplied by the intensity channel, where the color scale goes from 0 (black) to the maximum difference of 180° (white). The image 940 shows a result of thresholding the image 930 using a threshold of 90°.

Because the dynamic pattern is flashing, one may take into consideration accessibility guidelines regarding photosensitive seizure disorders. In some embodiments, according to one guideline, flashes may occur less than 3 times per second. In some embodiments, the dynamic pattern flashes 2.5 times per second, in compliance with the guideline. The pattern flashing frequency may be reduced. However, if the user moves significantly over the duration of the pattern half cycle (e.g., <0.2 seconds), the mobile device or the test app may not be able to localize the dynamic pattern.

Pattern localization can be performed, based on the easily detectable reference patterns from the rest of the scene described above. One can use connected-component labeling to isolate shapes corresponding to candidate pattern locations to localize the patterns in the scene. In some embodiments, when the pattern has a rectangular shape, the portion of the pattern in the capture image may have a non-rectangular shape. This may be due to occlusions to the pattern or the display is not parallel to the camera's sensor plane, when the image is captured. In the image coordinates, an enclosing rectangle, with respect to the pattern shape in the captured image, may be defined as the smallest possible rectangle (with sides parallel to the image borders) that completely encloses the non-rectangular pattern shape. In some embodiments, the pattern shapes may be subsequently filtered according to one or more following criteria, as described below. First, the area of the enclosing rectangle may be between 500 and 250,000 pixels, for a rectangular pattern. This may prevent selection of shapes that are too large or too small. Second, the aspect ratio of the enclosing rectangle may be between ⅓ and 3. This may prevent selection of shapes that are too wide or too narrow. Third, the fill factor (i.e., the area of the pattern shape divided by area of the enclosing rectangle) may be at least 95%. This may prevent selection of shapes that are not rectangular or deviate from a desired rectangular shape too much. If multiple candidate shapes satisfy these criteria, the candidate shape with the highest fill factor may be chosen. A region of interest ("ROI") comprising the enclosing rectangle shape of dimensions W×H and a border of min(W, H)/2 may be selected.

Figure 10:
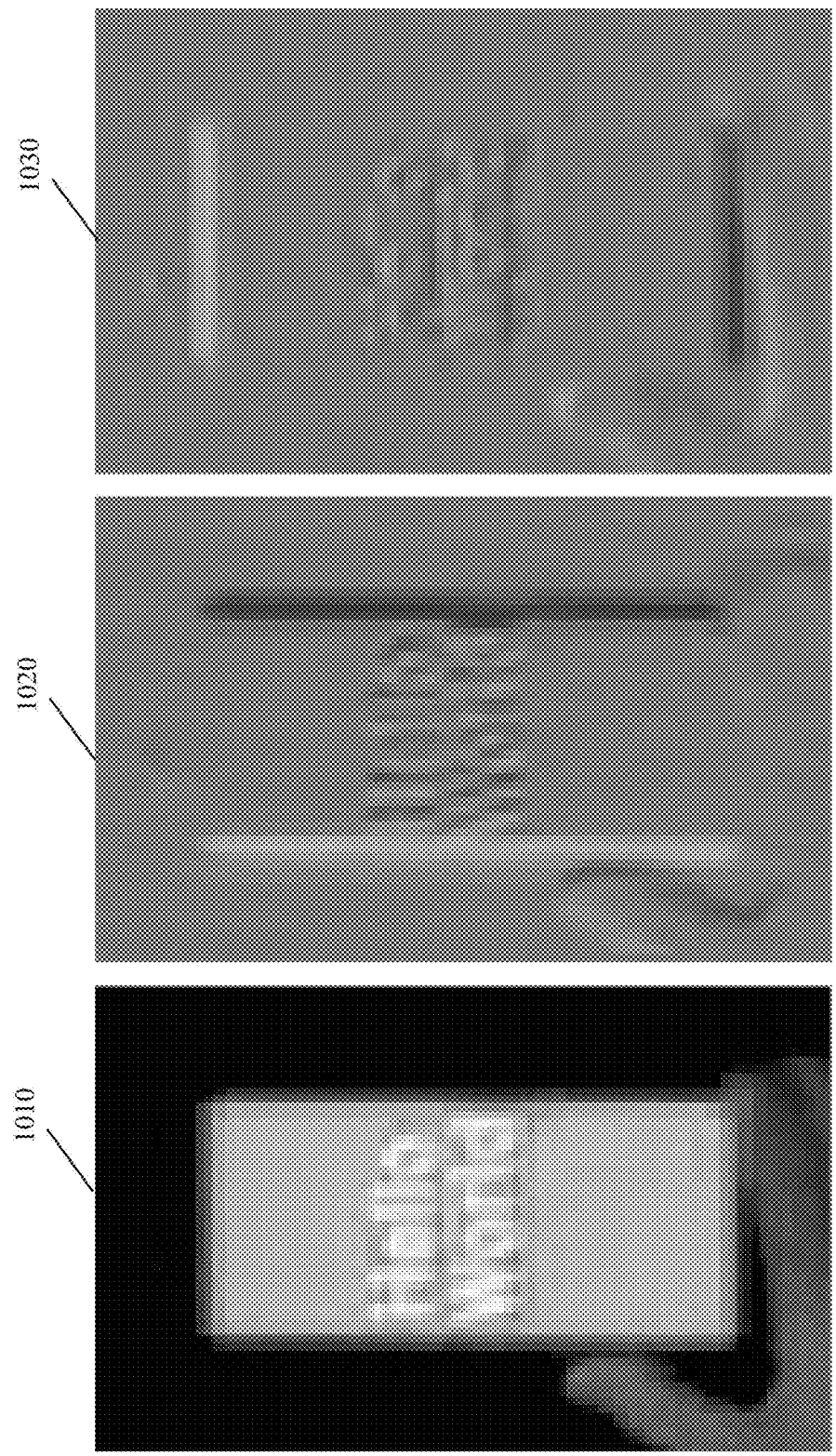
FIG. 10 illustrates exemplary visualizations when performing a segmentation of a reference pattern, in accordance with some embodiments of the present disclosure.

After determining the approximate location of the pattern, pattern segmentation may be performed by the mobile device to determine the pattern's precise borders. First, the mobile device can compute the horizontal and vertical gradients of the intensity channel, as illustrated in FIG. 10, which illustrates exemplary visualizations when performing a segmentation of a reference pattern, in accordance with some embodiments of the present disclosure. As shown in FIG. 10, the image 1010 shows an intensity channel of the captured image; the image 1020 shows a visualization of horizontal gradients of the intensity channel; and the image 1030 shows a visualization of vertical gradients of the intensity channel.

Figure 11:
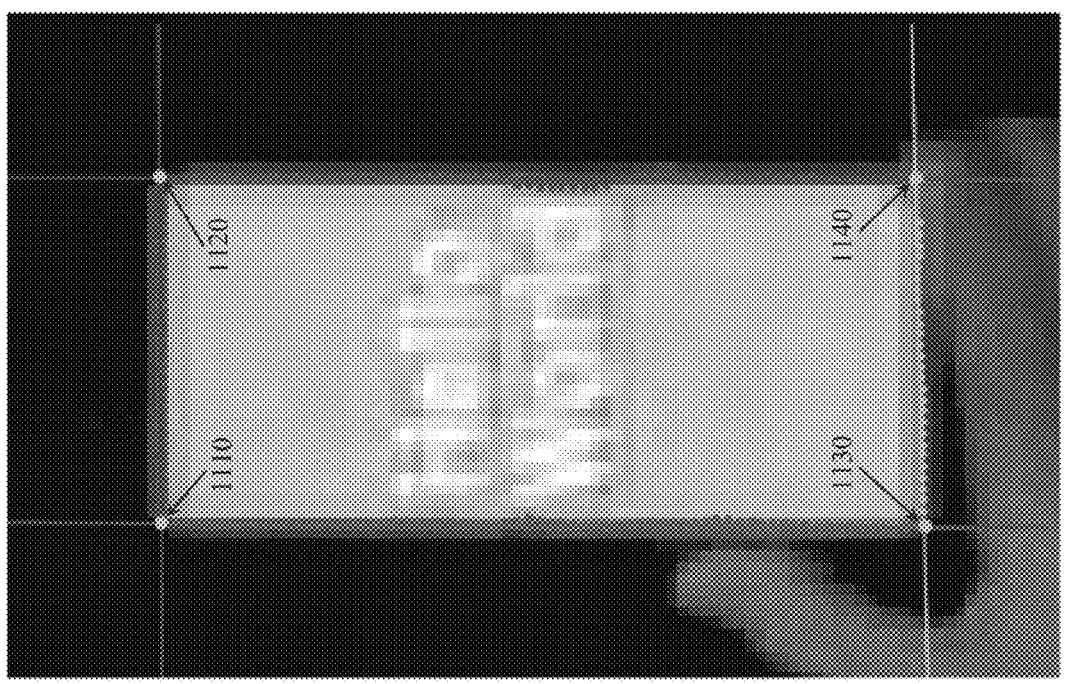
FIG. 11 illustrates an exemplary fitting of one or more lines to detect edges of a reference pattern, in accordance with some embodiments of the present disclosure.

Next, the mobile device can subdivide the ROI into four overlapping sub-regions: the left half, the right half, the top half, and the bottom half. These four regions may then be searched for the pattern's left, right, top, and bottom borders respectively. For each row in the left and right sub-regions, the mobile device can find the column for which the horizontal gradient has the largest magnitude. For each column in the top and bottom sub-regions, the mobile device can find the row for which the vertical gradient has the largest magnitude. If the resulting points have a gradient magnitude exceeding 255 (one quarter of the maximum possible value), then they are considered to be border points. The border points can be localized with subpixel precision by interpolating among the four points in the neighborhood of the row/column with the maximum gradient magnitude. For each pattern border, the points may be robustly fitted with a line using a line-fitting procedure. Then the corners of the pattern can be determined from the line intersections. This process is illustrated in FIG. 11, which illustrates an exemplary fitting of lines to detect edges and corners of a reference pattern, in accordance with some embodiments of the present disclosure. As shown in FIG. 11, a robust fitting of lines may be performed to detect edges of the rectangular shape of the pattern, which may be either a static pattern or a dynamic pattern. The small dots in FIG. 11 identify the detected border points; the solid lines connecting the dots identify the robust fit; and the large orange dots 1110, 1120, 1130, 1140 identify the inferred corner locations.

In order to determine the distance of the camera from the pattern, a pinhole model of the camera may be considered, as below:

$$z_c \begin{bmatrix} u \\ v \\ 1 \end{bmatrix} = K \begin{bmatrix} R & T \end{bmatrix} \begin{bmatrix} x \\ y \\ z \\ 1 \end{bmatrix}$$

where (x, y, z) may represent a point in world coordinates; (u, v) may represent a corresponding point in image coordinates; K is the 3×3 camera intrinsic matrix (which includes the focal length), [R T] may be the 3×4 extrinsic matrix in which R is a 3×3 rotation matrix that describes the camera's orientation and T may be a 3×1 column vector that describes the camera's position; and $z_c$ may be an arbitrary constant that permits the use of homogeneous coordinates. Without loss of generality, the pattern resides in the x-y plane and the center of the pattern may be the origin of the world coordinate system. The pinhole camera equation may thus become:

$$z_c \begin{bmatrix} u_{LL} & u_{LR} & u_{UR} & u_{UL} \\ v_{LL} & v_{LR} & v_{UR} & v_{UL} \\ 1 & 1 & 1 & 1 \end{bmatrix} = K [R\ T] \begin{bmatrix} -w/2 & w/2 & w/2 & -w/2 \\ -h/2 & -h/2 & h/2 & h/2 \\ 0 & 0 & 0 & 0 \\ 1 & 1 & 1 & 1 \end{bmatrix}$$

where w and h may be the physical width and height of the pattern, respectively, and the subscripts LL, LR, UR, UL on the image coordinates may correspond to lower left, lower right, upper right, and upper left corners, respectively.

Thus, all of the elements of the equation may be known with the exception of the extrinsic matrix [R T]. The mobile device can numerically solve for [R T] and determine the distance from $\|T\|$, the length of the vector that gives the camera position relative to the pattern center. In some embodiments, any or all of the reference pattern preprocessing, reference pattern localization, reference pattern segmentation and distance estimation described above can be performed locally at the mobile device or remotely at a computer or a cloud server.

Experiments have been carried to characterize the performance of the methods described above. In one embodiment, an experiment was conducted to evaluate the disclosed method against ground truth measurements and simulate the effect of varying the pattern size. A test app was created to display the dynamic pattern and record video from the front-facing camera simultaneously. The test app was installed on a mobile phone that was mounted on a tripod, which was placed at several distances to carry out the following steps.

Figure 12:
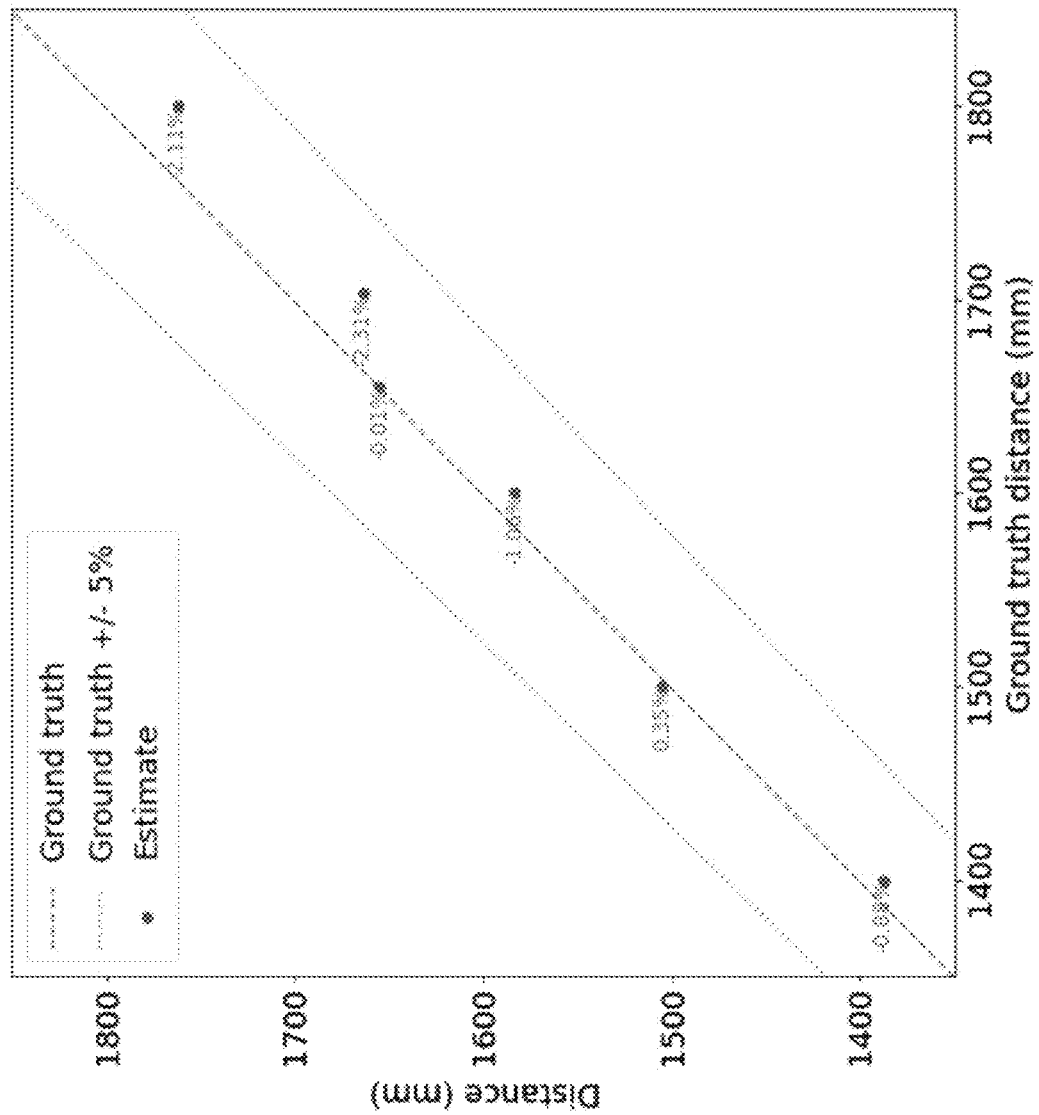
FIG. 12 illustrates an exemplary comparison between distance estimates of a disclosed method and a ground truth distance, in accordance with some embodiments of the present disclosure.

First, a ground truth distance from the mirror was measured using a laser measure. The laser was aimed at a paper note placed on the mirror to prevent strong reflections of the laser. Second, the test app was turned on to record a video while performing one of the distance estimation methods described above. Then, the video was analyzed in order to determine the estimated distances and compare them to the ground-truth values. The same process was performed for different distances, e.g., 1.4 meters, 1.6 meters, and 1.8 meters, between the mobile phone and the mirror. The results are shown in FIG. 12, which illustrates an exemplary comparison between distance estimates of a disclosed method and a ground truth distance at different distances, in accordance with some embodiments of the present disclosure. As shown in FIG. 12, the percent error was never larger than 2.5% at any measured distance.

Figure 13:
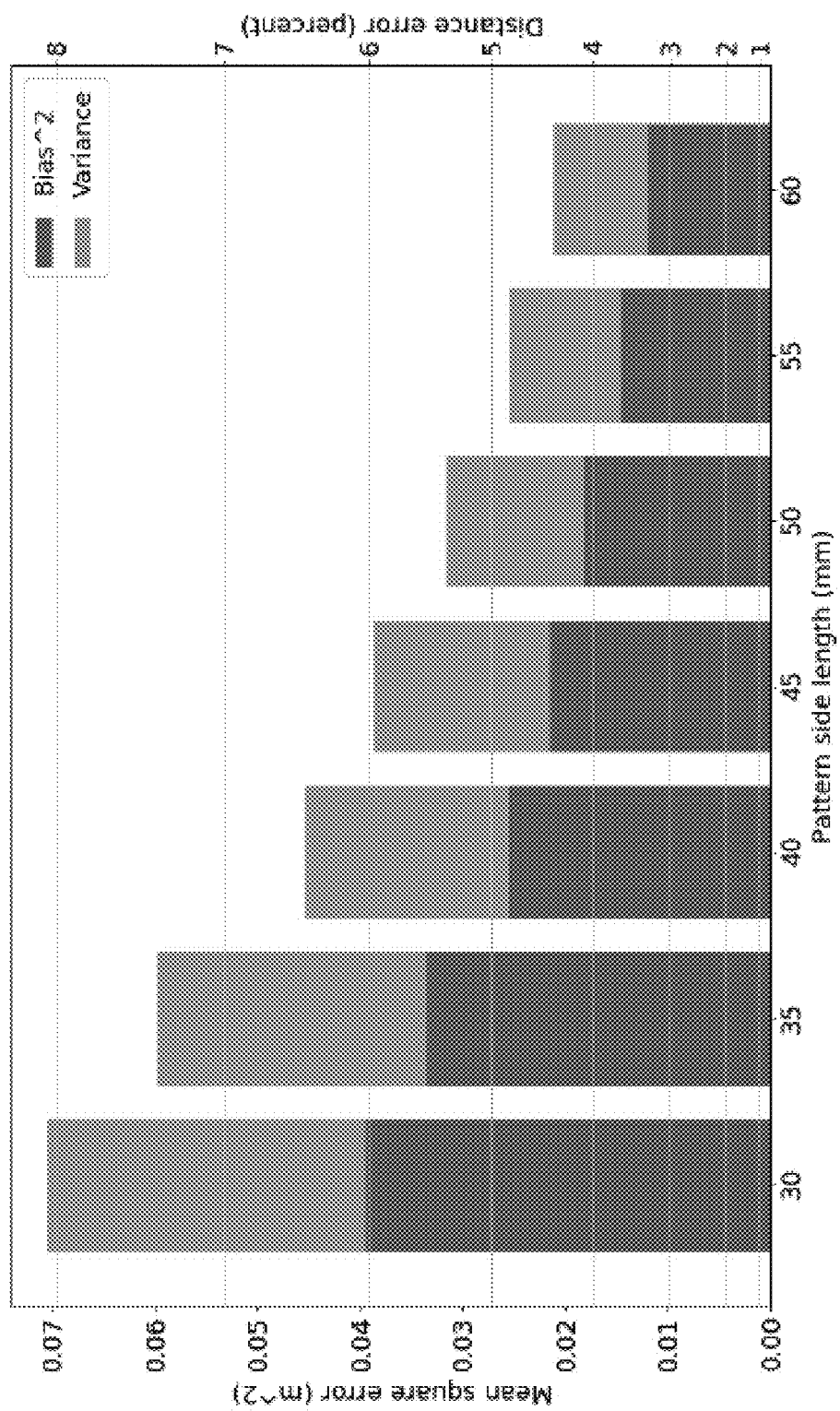
FIG. 13 illustrates exemplary mean square error results for different simulated pattern length sizes, in accordance with some embodiments of the present disclosure.

While the distance estimation approach may work best when the pattern is not occluded by the user's hand, the mobile device or test app may choose a size for the pattern such that there is ample room for the user to grip the phone comfortably without occluding the pattern. To evaluate how small the pattern can be before the distance estimation error becomes unacceptably large, the distance estimation method was simulated with different pattern sizes, using a nominal distance of 3.3 meters and a focal length, according to some embodiments. To model uncertainty in the corner localization, the true corner location was perturbed by a normal random variable with a standard deviation of 2 pixels. The results are depicted in FIG. 13, which illustrates exemplary mean square error results for different simulated pattern length sizes, in accordance with some embodiments of the present disclosure. For each distance, the mobile phone performed two measures: (1) bias squared, which captured the difference between the average estimate and the ground truth, and (2) variance, which captured how much the distance estimate deviates from its average. The bias squared and variance was added to give the mean square error ("MSE"). Breaking out the error into bias and variance is useful because one can employ different strategies to reduce them. To deal with variance, a mobile device may be configured to average over successive frames to get a more stable measurement, although this may introduce lag into the estimate. To deal with bias, the phone may be configured to add a "fudge factor" to compensate, although this may add complexity. To map the measurements into more intuitive units, the right vertical axis in FIG. 13 reports the equivalent percent error.

In some embodiments, after a user is positioned at a predetermined distance, which may be the target distance or a location within a target zone, the user may read an acuity chart with each eye, while the user covers the unused eye using either the user's phone (as shown in FIG. 5) or the user's free hand. In some embodiments, the vision test app may employ the distance estimation procedure above in a closed feedback loop to guide the user into position 1.65 meters from the mirror. If the user is too close to the mirror, the app may be configured to instruct the user to move back. If the user is too far from the mirror, the app may be configured to instruct the user to move forward. The app may be configured to use audio instructions and/or visual instructions that can be superimposed on the pattern without disrupting the distance estimation. In some embodiments, haptic cues could also be used.

Figure 14:
FIG. 14 illustrates an exemplary vision test screen, which can be on a display of a mobile device, in accordance with some embodiments of the present disclosure.

In some embodiments, once the user is in position, the app may display a single row of five black Sloan letters, spaced one letter width apart, on a white background. In some embodiments, the letters may be chosen randomly from a set of C, D, H, K, N, O, R, S, V and Z, with no letters repeating. The letters may be sized so their height corresponds to an angular resolution of 5 arc minutes, which at 3.3 meters is 4.8 mm. The letters may be horizontally reversed so that their reflection appears correctly, with an example depicted in FIG. 14, which illustrates an exemplary vision test screen, in accordance with some embodiments of the present disclosure. In some embodiments, a vision test screen may have a resolution of 1125×2346 with a display density of 458 dpi, corresponding to screen dimensions of 62.4×135.1 mm. The optotypes presented on the vision test screen may be 4.8 mm tall corresponding to 87 pixels high. In some embodiments, if the distance estimation procedure detects that the user's distance is acceptably close to, but not exactly matching, the target distance (e.g., is within the target zone), the optotypes could be resized to more closely match the target angular resolution. In some embodiments, when viewing the optotypes, the user may communicate one or more responses to the app. The mobile device may capture a full audio and/or video of the vision test using the phone's microphone and camera, respectively, or may use voice recognition to automatically parse the user's responses and compute their visual acuity.

In some embodiments, instead of Sloan letters, the optotypes could be Landolt Cs—idealized letter Cs in different orientations. To demonstrate their acuity, the user may indicate the location of the opening. These responses may be conveyed via voice. In some embodiments, the responses may be expressed using hand gestures, as this prevents the user from having to distinguish between left and right in the moment. The hand gestures may be recorded by the camera and manually interpreted off-line or automatically interpreted using machine learning. In some embodiments, the user responses may be conveyed using a combination of voice and physical gestures (e.g., hand, arm, leg, etc.).

The mobile device may record the user input and calculate an acuity score. In some embodiments, the mobile device may store both the acuity score and the user input in one or more files or objects, which may be associated with a user profile or identifier. As will be understood by one of ordinary skill in the art, the raw visual acuity score may be calculated from the user input and may be calculated based on a proportion and size of the optotypes a user identified assuming a nominal optotype size and distance.

In some embodiments, an acuity correction calculation may be determined and applied to an acuity score. As noted above, the acuity correction calculation may be applied to an acuity test score after the user completes the test, but prior to a doctor, clinician, or other professional reviews the score, although one of ordinary skill in the art will understand that the acuity correction calculation may be determined at other times. One example of determining an acuity correction calculation includes determining an angular resolution, $\theta$, according to:

$$\theta = \left(\frac{d^*}{d}\right)\theta^*$$

where $\theta^*$ is the minimum angle of resolution (MAR) at nominal (or target) distance $d^*$, and d is the distance at which the user actually performs the acuity test.

Taking the base 10 logarithm of both sides of the above equation yields:

$$A = A^* + \log_{10}\left(\frac{d^*}{d}\right)$$

where $A^*$ is the initially measured visual acuity (measured in log MAR) and A is the corrected acuity for a subject at a distance d.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To illustrate this interchangeability of hardware, firmware and software clearly, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art will understand that various illustrative logical blocks, modules, devices, components and circuits described herein can be implemented within or performed by an integrated circuit ("IC") that can include a digital signal processor ("DSP"), an application specific integrated circuit ("ASIC"), a field programmable gate array ("FPGA") or other programmable logic device, or any combination thereof. The logical blocks, modules, and circuits can further include antennas and/or transceivers to communicate with various components within the network or within the device. A processor programmed to perform the functions herein will become a specially-programmed or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, may refer to software, firmware, hardware, and any combination of these elements for performing the associated functions described herein. Additionally, for the purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the broadest scope consistent with the novel features and principles disclosed herein.

What is claimed is:

1. A non-transitory machine-readable medium having machine-executable instructions embodied therein, wherein the machine-executable instructions, when executed by a processor, cause the processor to perform a method, the method comprising:
    presenting a reference pattern on a display screen;
    capturing, using a camera of a mobile device when a user is at a current distance from a mirror and the reference pattern is presented on the display screen, at least one image of a reflection of the mobile device in the mirror;
    determining the current distance between the user and the mirror based on: a focal length of the camera, the at least one image, and a predetermined physical size of the reference pattern;
    interactively guiding a user to a predetermined distance from the mirror based on the at least one image and the current distance;
    presenting material on the display screen upon a determination that the user is at the predetermined distance from the mirror; and
    receiving input from the user in response to the material presented on the display screen and reflected in the mirror,
    wherein the material presented on the display screen is for assessing at least one characteristic of the user's vision.

2. The non-transitory machine-readable medium of claim 1, wherein:
    the mobile device is held approximately in at least one of a vertical, horizontal or diagonal orientation by the user and is parallel to the mirror; and
    the camera and the display screen are located on a same side of the mobile device.

3. The non-transitory machine-readable medium of claim 1, wherein determining the current distance comprises:
    preprocessing the reference pattern to generate a binary image including at least one candidate shape of the reference pattern;
    performing a localization of the reference pattern in the at least one image; and
    performing a segmentation of the reference pattern from the at least one image.

4. The non-transitory machine-readable medium of claim 3, wherein:
    the reference pattern comprises a static solid-colored pattern with a fixed reference color;
    the at least one image comprises an image of a reflection of the reference pattern in the mirror; and
    preprocessing the reference pattern comprises:
        computing a pixel-wise difference between the image and the fixed reference color to generate a difference image, and
        inverse thresholding the difference image with a predetermined value to generate the binary image including at least one candidate shape of the reference pattern.

5. The non-transitory machine-readable medium of claim 4, wherein the reference pattern has an aqua color with RGB components of (0, 255, 255) and is surrounded by a black border.

6. The non-transitory machine-readable medium of claim 3, wherein:
    the reference pattern comprises a dynamic solid-colored pattern with a reference color that is time-varying in a predetermined manner;
    the reference pattern cycles through a plurality of image frames each with a different color at a predetermined frame rate;
    the at least one image comprises a full cycle of the image frames of the reference pattern;
    each of the image frames is an image of a reflection of the reference pattern in the mirror during a respective time frame; and
    preprocessing the reference pattern at a current image frame comprises:
        determining a past image frame having a color complementary to a color of the current image frame,
        comparing a hue channel of the current image frame to a hue channel of the past image frame to calculate a hue difference,
        multiplying the hue difference with an intensity channel of the current image frame to generate a difference image, and
        thresholding the difference image with a predetermined value to generate the binary image including at least one candidate shape of the reference pattern.

7. The non-transitory machine-readable medium of claim 3, wherein performing the localization of the reference pattern comprises:
    isolating the at least one candidate shape of the reference pattern from the at least one image;
    filtering the at least one candidate shape based on at least one criterion related to a shape of the reference pattern presented on the display screen; and
    determining, in each of the at least one image, a region of interest ("ROI") comprising the shape of the reference pattern and a border surrounding the shape, based on the filtering.

8. The non-transitory machine-readable medium of claim 7, wherein the at least one criterion comprises:
    the shape of the reference pattern with respect to an enclosing rectangle has an area within a predetermined area range;
    the enclosing rectangle has an aspect ratio between ⅓ and 3; and
    a fill factor of the shape with respect to the enclosing rectangle is at least 95%.

9. The non-transitory machine-readable medium of claim 7, wherein performing the segmentation of the reference pattern comprises:

computing horizontal and vertical gradients of an intensity channel of the at least one image;
dividing the ROI into four overlapping sub-regions: a left sub-region, a right sub-region, a top sub-region and a bottom sub-region;
for each row in the left and right sub-regions, determining a column for which the horizontal gradient has the largest magnitude, to generate left and right border points based on a magnitude threshold;
for each column in the top and bottom sub-regions, determining a row for which the vertical gradient has the largest magnitude, to generate top and bottom border points based on the magnitude threshold;
fitting the border points with lines to determine edges of the reference pattern; and
determining corners of the reference pattern based on intersections of the fitted lines.

10. The non-transitory machine-readable medium of claim 9, wherein determining the current distance further comprises:
measuring a size of the reference pattern in pixels based on the determined edges and corners of the reference pattern; and
calculating the current distance between the user and the mirror based on: the focal length of the camera in pixels, the measured size of the reference pattern in pixels, and the predetermined physical size of the reference pattern.

11. The non-transitory machine-readable medium of claim 10, wherein the predetermined physical size of the reference pattern is predetermined based on a physical size of the display screen of the mobile device.

12. The non-transitory machine-readable medium of claim 1, wherein:
the at least one image comprises a plurality of images all captured during one time frame when the user is at the current distance from the mirror; and
determining the current distance comprises:
preprocessing the reference pattern in each of the plurality of images,
performing a localization of the reference pattern in each of the plurality of images,
performing a segmentation of the reference pattern from each of the plurality of images to generate a plurality of segmented reference patterns,
measuring a size of each segmented reference pattern in pixels;
determining, with respect to each segmented reference pattern, an estimated current distance between the user and the mirror based on: the focal length of the camera in pixels, the measured size of the segmented reference pattern in pixels, and the predetermined physical size of the reference pattern, to generate a plurality of estimated current distances, and
calculating the current distance between the user and the mirror based on an aggregation of the plurality of estimated current distances, wherein the aggregation comprises computing an average, a weighted average or a median based on the plurality of estimated current distances.

13. The non-transitory machine-readable medium of claim 1, wherein interactively guiding the user comprises:
presenting, on the display screen, a first indication of the current distance between the user and the mirror;
providing a second indication to the user when the predetermined distance has been reached;
providing an instruction to the user to move in a direction relative to the mirror;
providing an instruction to the user when at least part of the reference pattern is blocked by the user; and
automatically resizing the reference pattern presented on the display screen when at least part of the reference pattern is blocked by the user.

14. The non-transitory machine-readable medium of claim 1, further comprising:
recording, using the camera, a video of the input from the user when the input comprises a hand gesture of the user;
recording, using a microphone of the mobile device, an audio of the input from the user when the input comprises a voice of the user; and
assessing at least one characteristic of the user's vision based on the recorded video and audio.

15. The non-transitory machine-readable medium of claim 1, wherein the predetermined distance is a distance in a predetermined range of distances.

16. The non-transitory machine-readable medium of claim 15, wherein the predetermined distance is different from a nominal distance in the predetermined range of distances.

17. The non-transitory machine-readable medium of claim 16, wherein the method includes:
determining a first acuity score for the user based on input received from the user; and
determining an acuity correction calculation for the user based, at least in part, on a ratio of the nominal distance and the predetermined distance.

18. The non-transitory machine-readable medium of claim 1, wherein the method includes guiding the user to hold the mobile device such that both the user and the display screen of the mobile device are facing the mirror.

19. The non-transitory machine-readable medium of claim 1, wherein the method includes:
estimating at least one physical length feature of the user; and
wherein the current distance from the user to the display screen of the mobile device also is based on the at least one physical length feature.

* * * * *